US012271587B1

(12) United States Patent
Liu et al.

(10) Patent No.: US 12,271,587 B1
(45) Date of Patent: Apr. 8, 2025

(54) SURFACE-BASED 3D MODELLING TECHNIQUES ON TOUCHSCREEN DEVICE WITH ANGLE-ADJUSTABLE TOUCHSCREEN

(71) Applicant: City University of Hong Kong, Kowloon (HK)

(72) Inventors: Can Liu, Kowloon (HK); Alvaro Cassinelli, Kowloon (HK); Chenyue Dai, Changzhou (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 18/483,249

(22) Filed: Oct. 9, 2023

(51) Int. Cl.
G06F 3/0488 (2022.01)
G06F 3/01 (2006.01)
G06F 3/04815 (2022.01)
G06F 3/0484 (2022.01)
G06F 3/14 (2006.01)
G06T 19/20 (2011.01)

(52) U.S. Cl.
CPC ............ *G06F 3/0488* (2013.01); *G06F 3/012* (2013.01); *G06F 3/016* (2013.01); *G06F 3/04815* (2013.01); *G06F 3/0484* (2013.01); *G06F 3/1423* (2013.01); *G06T 19/20* (2013.01); *G06F 2203/04803* (2013.01); *G06T 2200/24* (2013.01); *G06T 2219/2004* (2013.01)

(58) Field of Classification Search
None
See application file for complete search history.

(56) References Cited

U.S. PATENT DOCUMENTS 9,047,046 B2 * 6/2015 Kii .................... G06F 1/1641
11,079,995 B1 * 8/2021 Hulbert ............... G06F 3/04815

FOREIGN PATENT DOCUMENTS

WO 2019/173118 A1 9/2019

OTHER PUBLICATIONS

Alcock et al., "Barriers to Using, Customizing, and Printing 3D Designs on Thingiverse", ACM, Nov. 13-16, 2016, 5 pages.
Bai et al.,"Freeze View Touch and Finger Gesture based Interaction Methods for Handheld Augmented Reality Interfaces", IVCNZ, Nov. 26-28, 2012, 6 pages.

(Continued)

*Primary Examiner* — Duane N Taylor, Jr.
(74) *Attorney, Agent, or Firm* — Amin, Turocy & Watson, LLP

(57) ABSTRACT

One or more systems, methods and/or machine-readable mediums are described herein for allowing display and manipulation of surface-based 3D modelling on touchscreens being adjustable relative to one another. A method can comprise displaying, by a mobile device comprising a processor, a first part of virtual content via a first display screen portion of a pair of display screen portions and a second part of the virtual content via a second display screen portion of the pair of display screen portions. The first display screen portion and the second display screen portion are part of the mobile device and are pivotable relative to each other to define an angle between the first display screen portion and the second display screen portion. Displaying the first part of the virtual content comprises displaying a feature of the virtual content that is aligned along a first surface plane of the first display screen portion.

20 Claims, 16 Drawing Sheets

(56) References Cited

OTHER PUBLICATIONS

Batmaz et al.,"Touch the Wall : Comparison of Virtual and Augmented Reality with Conventional 2D Screen Eye-Hand Coordination Training Systems", IEEE Conference on Virtual Reality and 3D User Interfaces (VR), 2020, 11 pages.
Brudy et al.,"Cross-Device Taxonomy: Survey, Opportunities and Challenges of Interactions Spanning Across Multiple Devices", CHI Paper, May 4-9, 2019, 28 pages.
Bueschel et al."Foldable3D: Interacting with 3D Content Using Dual-Display Devices", ACM, ISS, Nov. 6-9, 2016, 6 pages.
Cassinelli et al.,"The Volume Slicing Display", ResearchGate, Dec. 2009, 3 pages.
Cano Juan Luis Chulilla, "The Cambrian Explosion of Popular 3D Printing", International Journal of Artificial Intelligence and Interactive Multimedia, vol. 1, No. 4, 2011, 3 pages.
Cohe et al., "tBox: A 3D Transformation Widget designed for Touch-screens", CHI, May 7-12, 2011, 4 pages.
Araujo et al., "Mockup Builder: Direct 3D Modeling on and Above the Surface in a Continuous Interaction Space", Graphics Interface Conference, May 28-30, 2012, 8 pages.
Riviere et al.,"CubTile: a Multi-Touch Cubic Interface", ACM ISBN, Oct. 27-29, 2008, 4 pages.
Forsberg et al., "ErgoDesk: A Framework for Two- and Three-Dimensional Interaction at the ActiveDesk", Brown University Site of the NSF Science and Technology Center for Computer Graphics and Scientific Visualization, 1998, 7 pages.
Goh et al.,"3D Object Manipulation Techniques in Handheld Mobile Augmented Reality Interface: A Review", IEEE Access, vol. 07, Mar. 20, 2019, 21 pages.
Hachet et al.,"Toucheo: Multitouch and Stereo Combined in a Seamless Workspace", User Interface Software and Technology , Oct. 16-19, 2011, 6 pages.
Hancock et al.,"Sticky Tools: Full 6DOF Force-Based Interaction for Multi-Touch Tables", The ACM International Conference on Interactive Tabletops and Surfaces, 2009, 8 pages.
Hancock et al.,"Rotation and Translation Mechanisms for Tabletop Interaction", IEEE Computer Society, 2006, 8 pages.
Huang Danny Ziyang,"Analysis of the Impact of Foldable Mobile Phones Design on People's Lives", Atlantis Press SARL, vol. 586, 2021, 6 pages.
Hutchins et al.,"Direct Manipulation Interfaces", Human-Computer Interaction, vol. 1, 1985, pp. 311-338.
Khalilbeigi et al.,"FoldMe: Interacting with Double-sided Foldable Displays", TEI, Feb. 19-22, 2012, 8 pages.
Mills et al.,"The UCube: A Child-Friendly Device for Introductory Three-Dimensional Design", IDC, Jun. 20-23, 2011, 9 pages.
Lee et al.,"Interactive Manipulation of Augmented Objects in Marker-less AR Using Vision based Hand Interaction", Seventh International Conference on Information Technology, 2010, 6 pages.
Leen et al.,"JigFab: Computational Fabrication of Constraints to Facilitate Woodworking with Power Tools", CHI, May 4-9, 2019, 12 pages.
Lipson et al.,"Factory @ Home: The Emerging Economy of Personal Fabrication", Occasional Papers in Science and Technology Policy, Dec. 2010, 104 pages.
Lipton et al.,"Robot Assisted Carpentry for Mass Customization", IEEE International Conference on Robotics and Automation (ICRA), May 21-25, 2018, 8 pages.
Liu et al.,"Two-Finger Gestures for 6DOF Manipulation of 3D Objects", The Eurographics Association and Blackwell Publishing Ltd., vol. 31, No. 7, 2012, 9 pages.
Marquardt et al.,"SurfaceConstellations: A Modular Hardware Platform for Ad-Hoc Reconfigurable Cross-Device Workspaces", CHI, Apr. 21-26, 2018, 14 pages.
Martinet et al.,"Integrality and Separability of Multitouch Interaction Techniques in 3D Manipulation Tasks", IEEE Computer Society, vol. 18, No. 3, Mar. 2012, 12 pages.

Millette et al.,"DualCAD: Integrating Augmented Reality with a Desktop GUI and Smartphone Interaction", 2016 IEEE International Symposium on Mixed and Augmented Reality Adjunct Proceedings, 2016, 6 pages.
Mota et al.,"The Rise of Personal Fabrication", Creativity & Cognition, Nov. 3-6, 2011, 9 pages.
Nanjappan et al.,"User Elicited Dual hand Interactions for Manipulating 3d Objects in Virtual Reality Environments", Human Centrice Computer Information Science, vol. 8, No. 31, 2018, 16 pages.
Nguyen et al.,"Poster: 3-Point++: A New Technique for 3D Manipulation of Virtual Objects", IEEE Symposium on 3D User Interfaces, Mar. 16-17, 2013, 2 pages.
Oh et al.,"SESAME: 3D Conceptual Design System", International Conference on Computer Graphics and Interactive Techniques, Aug. 8, 2004, 1 page.
Okada et al.,"Manipulation Using Magnet Metaphor for 2D and 3D Integrated Toolkit Systems", ICAT, Dec. 3-5, 2003, 6 pages.
Pfeuffer et al.,"Bi-3D: Bi-Manual Pen-and-Touch Interaction for 3D Manipulation on Tablets", User Interface Software and Technology, Oct. 10-14, 2021, 13 pages.
Pla et al.,"Display Blocks: A Set of Cubic Displays for Tangible, Multi-Perspective Data Exploration", TEI, Feb. 10-13, 2013, 8 pages.
Raedle et al.,"HuddleLamp: Spatially-Aware Mobile Displays for Ad-hoc Around-the-Table Collaboration", ITS, Nov. 16-19, 2014, 10 pages.
Ramakers et al.,"Paddle: Highly Deformable Mobile Devices with Physical Controls", CHI, 2014, 10 pages.
"What Is Woodworking? A Total Beginner's Guide", Woodworking for Mere Mortals, Mar. 22, 2019, 10 pages.
Reisman et al.,"A Screen-Space Formulation for 2D and 3D Direct Manipulation", User Interface Software and Technology, Oct. 4-7, 2009, 10 pages.
Rekimoto Jun,"Transvision: A Hand-held Augmented Reality System for Collaborative Design" Sony Computer Science Laboratory Inc., 1996, 6 pages.
Rekimoto Jun,"SmartSkin: An Infrastructure for Freehand Manipulation on Interactive Surfaces", CHI, vol. 4, No. 1, Apr. 20-25, 2002, 8 pages.
Monfared et al.,"Tent Mode Interactions: Exploring Collocated Multi-User Interaction on a Foldable Device", MobileHCI, Oct. 5-8, 2020, 12 pages.
Sherugar et al.,"Direct Manipulation: Definition", NN/g Nielsen Norman Group, Aug. 21, 2016, 9 pages.
Shneiderman Ben,"Direct Manipulation: A Step Beyond Programming Languages", IEEE, Aug. 1983, 13 pages.
Stavness et al.,"PCubee: A Perspective-Corrected Handheld Cubic Display", CHI, Apr. 10-15, 2010, 10 pages.
Steimle et al.,"Flexpad: Highly Flexible Bending Interactions for Projected Handheld Displays", CHI, 2013, 10 pages.
Surale et al.,"TabletInVR: Exploring the Design Space for Using a Multi-Touch Tablet in Virtual Reality", CHI May 4-9, 2019, 13 pages.
Telkenaroglu et al.,"Dual-Finger 3D Interaction Techniques for Mobile Devices", Personal and Ubiquitous Computing, Sep. 4, 2012, vol. 17, 1551-1572 page.
Wang et al.,"Real-Time Hand-Tracking with a Color Glove", ACM Transactions on Graphics, vol. 28, No. 3, Article 63, Aug. 2009, 8 pages.
Watanabe et al.,"The Deformable Workspace: a Membrane between Real and Virtual Space", IEEE, 2008, 8 pages.
Weichel et al."MixFab: A Mixed-Reality Environment : A Mixed-Reality Environment for Personal Fabrication", CHI, 2014, 10 pages.
Wilson et al.,"Brining Physics to the Surface", User Interface Software and Technology, Oct. 19-22, 2008, 10 pages.
Wu et al.,"Touchsketch: A Touch-based Interface for 3d Object Manipulation and Editing", Virtual Reality Software and Technology, Nov. 13-15, 2015, 10 pages.
Liu, et al.,"AngleCAD: Surface-Based 3D Modelling Techniques on Foldable Touchscreens," Proc. ACM Hum.-Comput. Interact., vol.

(56) References Cited

OTHER PUBLICATIONS

6, No. ISS, Article 582. Original Publication date: Nov. 14, 2022, https://doi.org/10.1145/3567735.

* cited by examiner

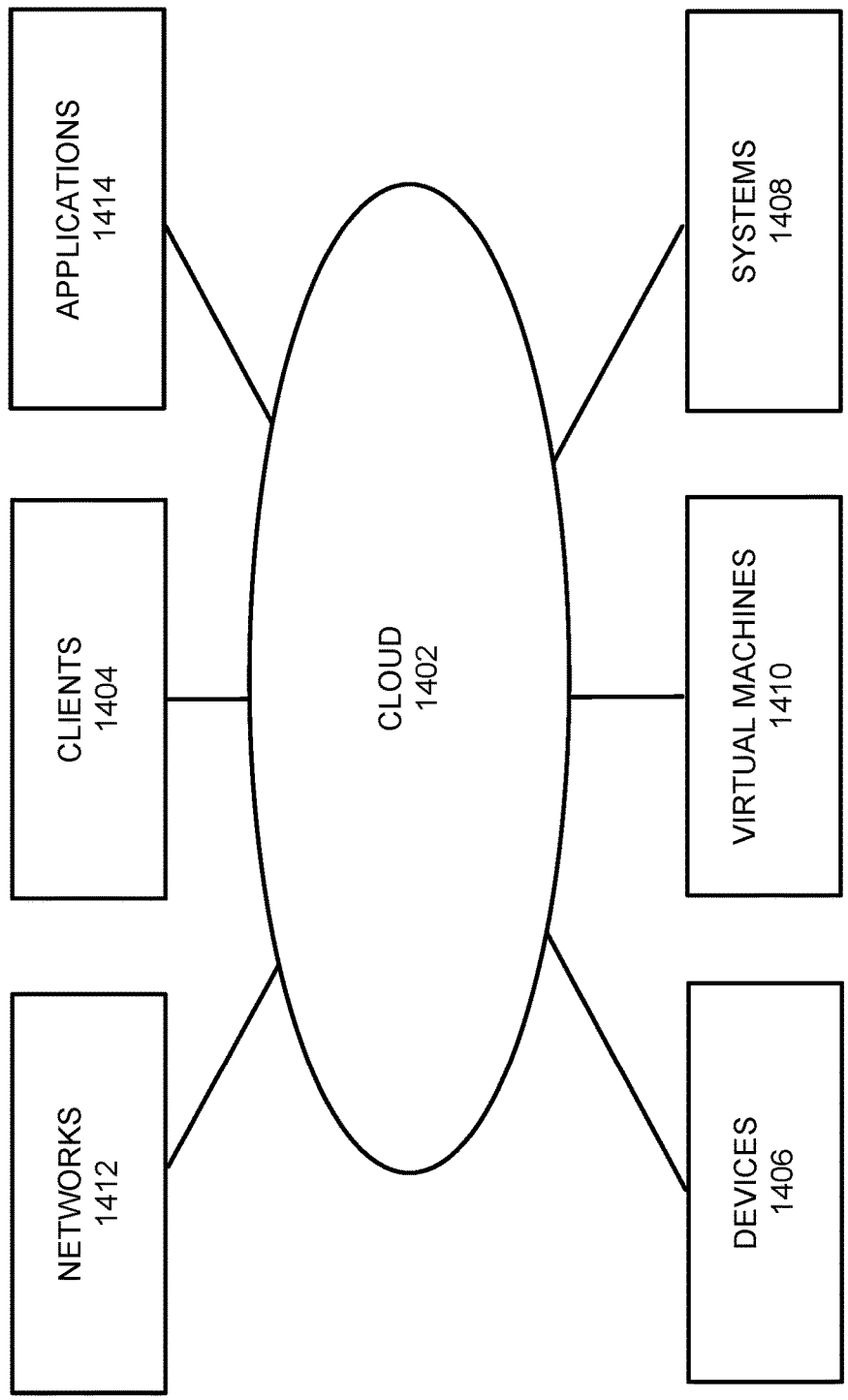

SURFACE-BASED 3D MODELLING TECHNIQUES ON TOUCHSCREEN DEVICE WITH ANGLE-ADJUSTABLE TOUCHSCREEN

BACKGROUND

Real-3D modelling and printing are becoming increasingly popular and increasingly used both domestically and commercially. Beginners to the technology often face high barriers of entry when trying to use existing 3D modelling tools, even for modelling of simple objects. This can be further complicated on devices that are mobile (e.g., mobile devices such as phones, tablets, computers, pads, etc.), in part due to lack of direct manipulation in a third dimension (e.g., a Z-dimension, relative to an X-dimension and a Y-dimension).

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

In one or more embodiments described herein, e.g., devices, systems, methods and/or machine-readable mediums are described that can facilitate display and manipulation of surface-based 3D modelling on two or more touchscreens being adjustable relative to one another.

According to an embodiment, a method can comprise displaying, by a mobile device comprising a processor, a first part of virtual content via a first display screen portion of a pair of display screen portions and a second part of the virtual content via a second display screen portion of the pair of display screen portions. The first display screen portion and the second display screen portion are part of the mobile device and are pivotable relative to each other to define an angle between the first display screen portion and the second display screen portion. Displaying the first part of the virtual content comprises displaying a feature of the virtual content that is aligned along a first surface plane of the first display screen portion. Displaying the second part of the virtual content comprises displaying a portion of the virtual content, determined as a function of the angle, along a second surface plane of the second display screen portion. The method further comprises receiving, via the second display screen portion, manipulation user input specifying to manipulate at least one of the first part and the second part of the virtual content as a function of the angle. The manipulation user input specifies a manipulation of the virtual content from a group of manipulations, comprising at least one of virtually moving the first part of the virtual content about or along a first virtual axis that extends transverse to the second surface plane of the second display screen portion or virtually moving the second part of the virtual content about or along a second virtual axis that extends transverse to the first surface plane of the first display screen portion.

According to another embodiment, a system can comprise a processor; a memory that stores computer executable instructions that are executable, using the processor, to perform operations, comprising: displaying respective portions of virtual content at a first display screen portion of a pair of display screen portions and at a second display screen portion of the pair of display screen portions, wherein the first display screen portion and the second display screen portion are pivotable relative to each other to define an angle; and responsive to manipulation at or along a second surface of the second display screen portion, based on user input corresponding to a user entity associated with the mobile device, and based on a first orientation of a first surface of the first display screen portion that is transverse relative to a second orientation of a second surface of the second display screen portion, virtually manipulating the virtual content along a virtual axis that extends transverse to the first surface, wherein the virtually manipulating is defined as a function of the angle.

According to yet another embodiment, a non-transitory machine-readable medium can comprise executable instructions that, when executed by a processor facilitate performance of operations, comprising: determining an angle between a pair of display screen portions of a mobile device, the pair of display screen portions comprising a first display screen portion and a second display screen portion that are pivotable relative to one another; displaying respective portions of virtual content on the first display screen portion and the second display screen portion based on positioning of respective intersecting surface planes of the first display screen portion and the second display screen portion relative to one another, wherein the displaying comprises representing the virtual content as extending along virtual components of each of virtual X-, Y- and Z-axes that align to physical components of each of physical X-, Y- and Z-axes defined by the respective intersecting first surface plane of the first display screen portion and second surface plane of the second display screen portion depending on the angle between the pair of display screen portions; and in response to manipulation at or along the second surface plane of the second display screen portions, altering the virtual content while maintaining alignment of at least one plane of the virtual content, defined by a pair of the virtual components of the virtual X-, Y- and Z-axes, to the respective surface plane of an alignment screen portion being the first display screen portion or of the second display screen portion.

A benefit of the aforementioned system, non-transitory machine-readable medium, and/or computer-implemented method can be low cost (e.g., learning time, effort) and/or low skill barrier for generating 3D models by providing an experience that simulates real-world manipulation due to the surface-based alignment of the virtual 3D model. This low cost and/or low skill can facilitate a low entry barrier for use of the one or more embodiments described herein.

Additionally, another benefit is use of device surface angles, device orientation, and/or user-entity eye orientation as alignment factors for aligning real-world axes of the mobile device with the virtual axes defining the 3D model. In this way, the correspondence between these two sets of axes can be defined based and user-entity preference.

Still another benefit is ability to manipulate the 3D model in three real-world dimensions, each of which can be represented by the adjustable displays (e.g., screens) of the mobile device being used. In this way, the low skill barrier can be facilitated by simulating a real-world object, such as by snapping one or more surfaces of the 3D model being manipulated to a surface of a display of the mobile device, or otherwise aligning the one or more surfaces of the 3D model relative to the surface of the display (e.g., parallel to, contiguous with, non-parallel to, transverse to, at a specified angle to, etc.).

Yet another benefit is the benefit of use of a pair of displays angled relative to one another to facilitate manipulations such as cutting, rotation, extrusion, drilling, etc. of the 3D model, with particular benefit in providing physical support and tactile feedback in the Z-dimension (e.g., a third dimension other than the X-dimension and Y-dimension).

DESCRIPTION OF THE DRAWINGS

Numerous embodiments, objects, and benefits of the present embodiments will be apparent upon consideration of the following detailed description, taken in conjunction with the accompanying drawings, in which like reference characters refer to like parts throughout.

FIG. 14 illustrates a block diagram of an example, non-limiting, cloud computing environment in which or with which the system of FIG. 1A or FIG. 1B can operation, in accordance with one or more embodiments described herein.

DETAILED DESCRIPTION

Figure 1A:
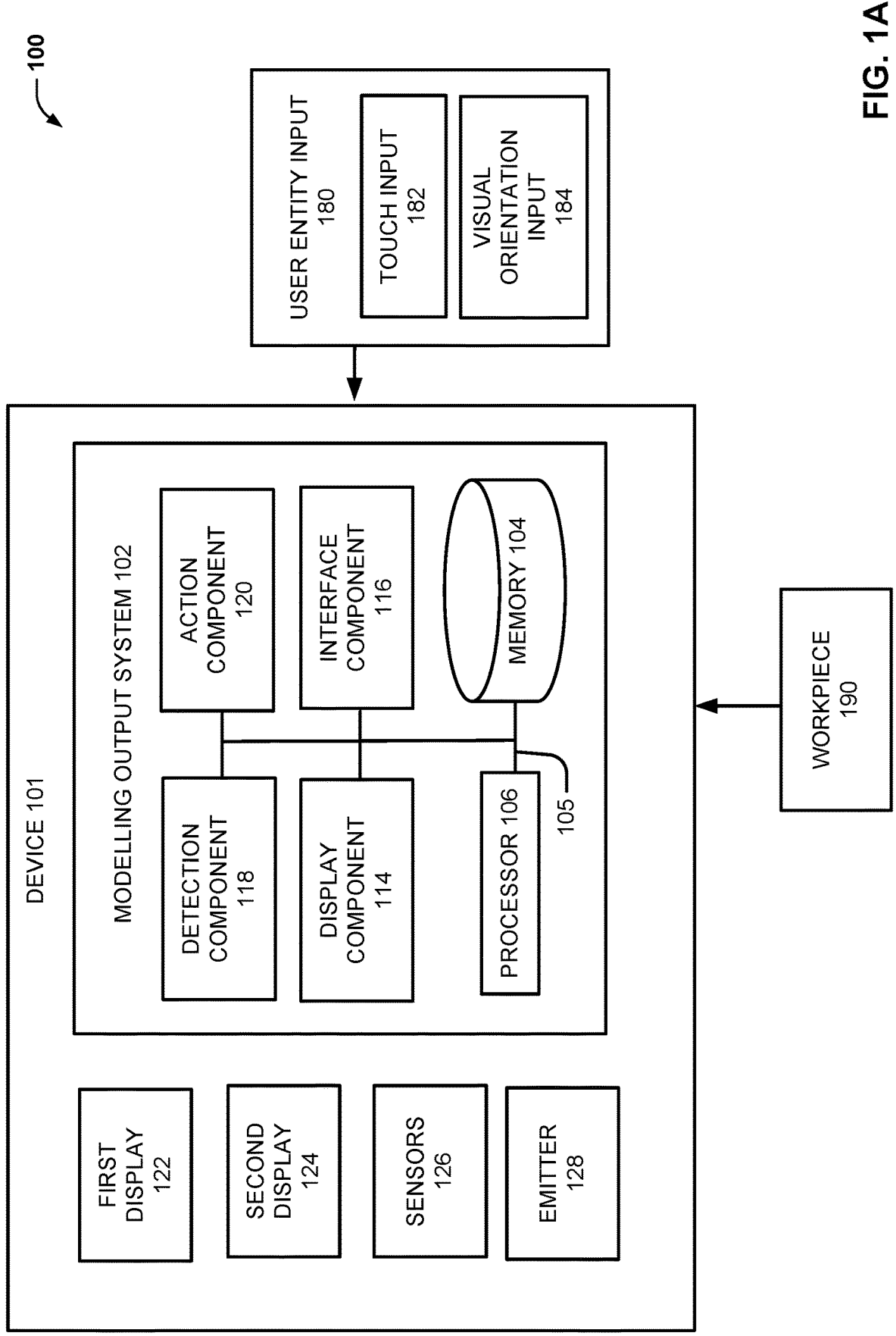
FIG. 1A illustrates an exemplary diagram of a device comprising a modelling output system, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Overview

Real-3D modelling and printing are becoming increasingly popular and increasingly used both domestically and commercially. Beginners to the technology often face high barriers of entry when trying to use existing 3D modelling tools, even for modelling of simple objects. New or casual makers often face serious barriers in learning 3D modelling software, which can be, at least in part, due to inability to visualize 3D space on softwares developed for 2D flat surfaces. This 2D-screen-bottleneck can pose a barrier to the visualization and manipulation of 3D objects where a software is unable to portray all six degrees of freedom (DOF) of 3D objects through 2D input and display devices. This can be particularly complicated on devices that are mobile (e.g., mobile devices such as phones, tablets, computers, pads, etc.), in part due to lack of direct manipulation in a third dimension (e.g., a Z-dimension, relative to an X-dimension and Y-dimension). That is, such 2D softwares utilize indirect manipulation, rather than direct manipulation, of the virtually modelled content. These existing frameworks can fail be causing low accuracy of touch inputs, lack of DOF specificity, touch element (e.g., finger) occlusion, and difficulty coming up to speed in use of the existing frameworks.

Additionally, immersive environments of alternate reality/virtual reality (AR/VR), while providing for manipulation of six DOF of 3D objects, devices for such AR/VR can lead to physical fatigue, lack of haptic feedback and lack of precision. User entities can find it difficult to perform positioning tasks or to keep a hand motionless in particular position for modelling. This can lead to non-use of the technology and/or lack of throughput in general, at least in part due to having to access the Z-dimension in unconventional and unnatural ways.

To account for one or more of these deficiencies, one or more embodiment described herein provide a framework for use of a device, such as a mobile device, such as a mobile phone, tablet, and/or the like to efficiently employ a pair of screen portions (e.g., screens, parts of a global screen, foldable screens, etc.) that are adjustable relative to one another (e.g., not fully fixed in their positioning) to allow for surface-based 3D visualization and manipulation. This can allow for extending multitouch surfaces into the Z-dimension and thus allow for axis in the Z-dimension.

Indeed, different from existing frameworks for 3D modelling, direct manipulation can be considered a classic principle for rapid learning in interaction literature (e.g., including 3D modelling softwares) due to the visual representation and manipulation of the objects and/or content of interest.

By employing an angle (e.g., a fold angle) between the screen portions of the pair of screen portions, the one or more embodiments described herein allow for direct touch interaction into the Z-dimension on one screen portion and direct touch interaction of the X- and Y-dimensions on another screen portion. This touch interaction can particularly be beneficial for casual or new modellers when snapping a feature of the virtual content being modelled to a plane of a surface of one of the screen portions of the pair, as allowed by the one or more embodiments described herein. This can aid in making or sculpting of 3D objects.

That is, in general, the one or more embodiments described herein provide a novel 3D modelling system, computer-implemented method, software, program and/or computer-readable medium for touch-based, direct interaction-based 3D modelling in three dimensions without the requirements of extensive experience or skills or extra hardware. For example, a human entity can be familiar with object touch and manipulation via use of object surfaces, such as in a fields of molding, woodworking, clay work, model work, etc. These familiarities are enabled and digitally-rendered by employing the one or more embodiments herein, to allow for virtual working of a model, such as prior to making a final real-world action on a workpiece.

The frameworks of the one or more embodiments described herein can allow a user entity (machine, device, component, hardware, software, smart device and/or human) to obtain 3D sensation by manipulating virtual content (e.g., a virtual object) in three dimensions using touch interaction (e.g., capacitive-based or tactile-based) of one or both of the screen portions of a pair of screen portions displaying the virtual content.

EXAMPLE EMBODIMENTS

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, one or more devices, systems and/or apparatuses thereof can further comprise one or more computer and/or computing-based elements described herein with reference to an operating environment, such as the operating environment 1300 illustrated at FIG. 13. In one or more described embodiments, computer and/or computing-based elements can be used in connection with implementing one or more of the systems, devices, apparatuses and/or computer-implemented operations shown and/or described in connection with one or more figures described herein.

As used herein, "data" can comprise metadata.

As used herein, "use" can comprise access.

As used herein, "cost" can refer to time, money, power, storage, memory, bandwidth, user entity labor and/or the like.

While one or more devices and/or systems are described below with reference to use on a mobile device, such as a mobile phone, tablet, pad and/or portable computer, the one or more embodiments described herein are not limited to this use. The one or more embodiments described herein also can be applicable to use by devices having auxiliary sensors, cameras and/or the like.

Turning now to the figures, one or more embodiments described herein can include one or more devices, systems, apparatuses and/or system-implemented methods that can enable a process to provide for direct and surface-based manipulation of 3D virtual content. Generally, the one or more embodiments can provide an efficient, reliable and versatile framework for 3D modelling without the need for extensive experience or understanding of 3D modelling softwares.

Generally, a modelling output system as described herein can employ raw data (e.g., data and/or metadata) from one or more sensors at an object, such as a mobile device and/or other device communicatively connectable to a mobile device. The raw data from the real-world environment can be employed to generate a display of virtual content and/or facilitate virtual content manipulation based on the raw data input at a pair of screen portions of the device, or of another device, that are adjustable relative to one another.

Looking first to FIG. 1A, a non-limiting system 100 is illustrated that can comprise one or more devices, systems, and/or apparatuses that can enable a process to provide for direct and surface-based manipulation of 3D virtual content. Generally, the one or more embodiments can provide an efficient, reliable and versatile framework for 3D modelling without the need for extensive experience or understanding of 3D modelling softwares, in accordance with one or more embodiments described herein.

The non-limiting system 100 can comprise a modelling output system 102 that can comprise any one or more suitable type of component, machine, device, facility, apparatus, and/or instrument that comprises a processor and/or can be capable of effective and/or operative communication with a wired and/or wireless network. Any one or more such suitable types of components can function in cooperation with another such suitable same or different type of component, as will be detailed below. All such embodiments are envisioned. For example, the modelling output system 102 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the modelling output system 102 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The modelling output system 102 can be associated with, such as accessible via, a cloud computing environment. For example, the modelling output system 102 can be associated with a cloud computing environment 1402 described below with reference to illustration 1400 of FIG. 14.

In one or more embodiments, a device, such as a mobile device 101 (e.g., a foldable mobile phone) can comprise the modelling output system 102, such as illustrated at FIG. 1.

In one or more other embodiments, the modelling output system 102 can be separate from the mobile device 101 but can supply data for use in generating a virtual content at the mobile device 101.

As illustrated, the mobile device 101 can comprise a first display screen portion 122, a second display screen portion 124, one or more sensors 126 and one or more sensory emitters 128. Sensors 126 can comprise one or more camera sensors, capacitive sensors, gyroscopic sensors, weight sensors, tactile sensors, inertial motion sensors, accelerometer sensors, infrared sensors, auditory sensors, etc. Sensory emitters 128 can comprise auditory, tactile, vibration and/or other sensory types of emitters.

Display at the first and second display screen portions 122 and 124 can be generated by any suitable display system, application, software and/or the like.

As illustrated, the mobile device 101 can be a combination device comprises two or more computing devices. For example, a first computing device can comprise the first display screen portion 122, and a second computing device can comprise the second display screen portion 124. Each of the first computing device and the second computing device can comprise one or more sensors 126 and one or more emitters 128. One of the first computing device or the second computing device can comprise the modelling output system 102, or alternatively, a separate computing device (e.g., separate from the first computing device and from the second computing device) can comprise the modelling output system 102.

Figure 1B:
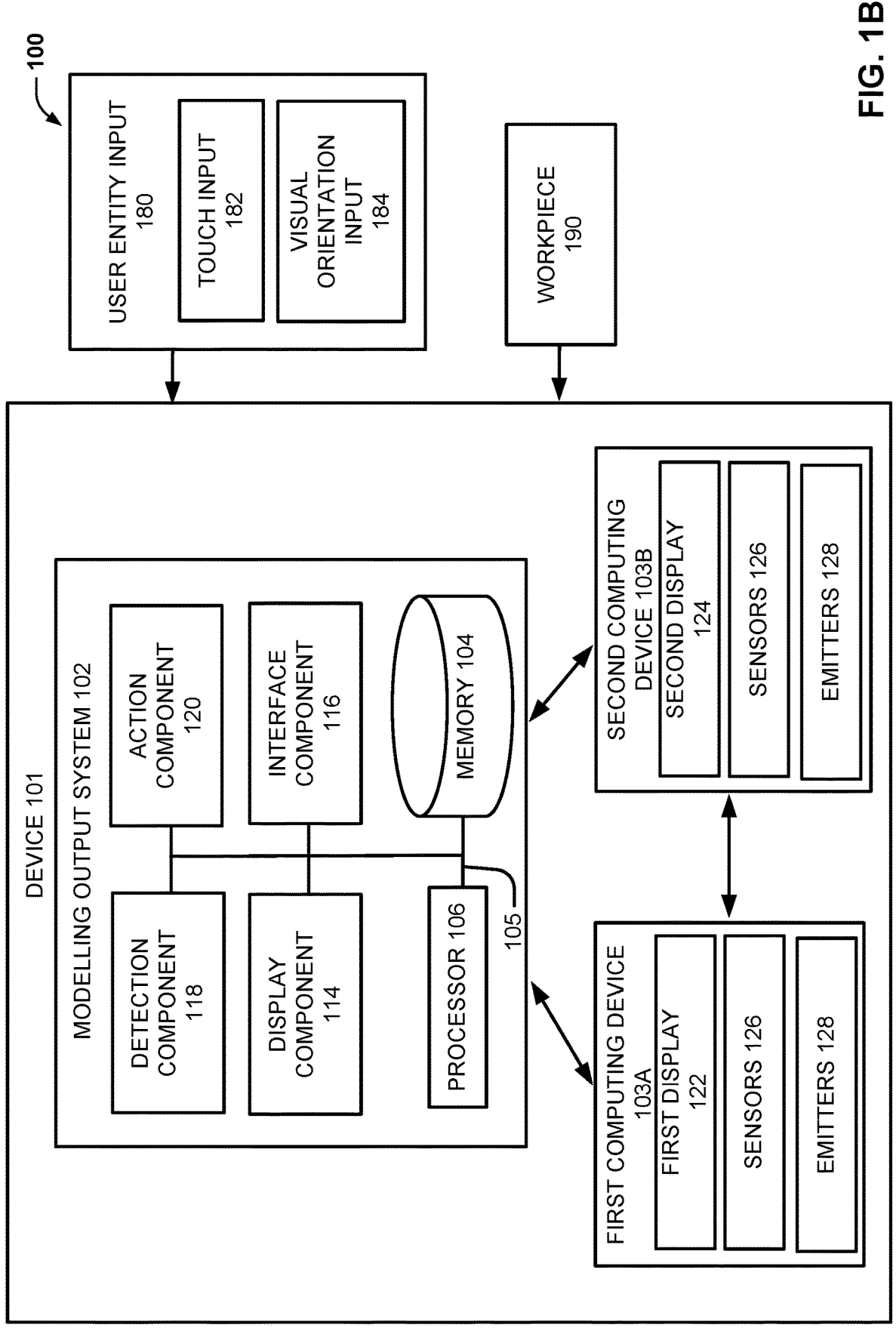
FIG. 1B illustrates another exemplary device comprising a modelling output system, in accordance with one or more embodiments described herein.

Turning briefly to FIG. 1B, another illustrated embodiment of the device 101 is directly illustrated as a combination mobile device 101. Description relative to FIG. 1A, both above and below, is also applicable to FIG. 1B, where suitable. This device 101 of FIG. 1B can comprise at least a first computing device 103A and a second computing device 103B, each of which have a display screen portion, one or more sensors 126 and one or more sensory emitters 128, as described above. The first computing device 103A can comprise the first display screen portion 122 and the second computing device 103B can comprise the second display screen portion 124.

The first display screen portion 122 and the second display screen portion 124 can be communicatively connected, such as via any physical or non-physical connection to allow for the determination of an angle between the display screen portions 122 and 124. That is, the first computing device 103A and the second computing device 103B can be communicatively connected, such as via any physical or non-physical connection.

In one or more embodiments, the modelling output system 102 can be comprised by at least one of the first computing device 103A and second computing device 103B.

In one or more embodiments, each of the first computing device 103A and second computing device 103B can comprise a version of the modelling output system 102.

In one or more embodiments, relative to the first computing device 103A and the second computing device 103B, the modelling output system 102 can function as, comprise, or be comprised as part of, a distributed system. That is, a service, software, code, microservice, application and/or the like can be downloaded to the first computing device 103A and second computing device 103B. A virtual or physical connection can be employed between the two or more display screen portions to allow for determination of the one or more angles between the two or more display screens.

Figure 2:
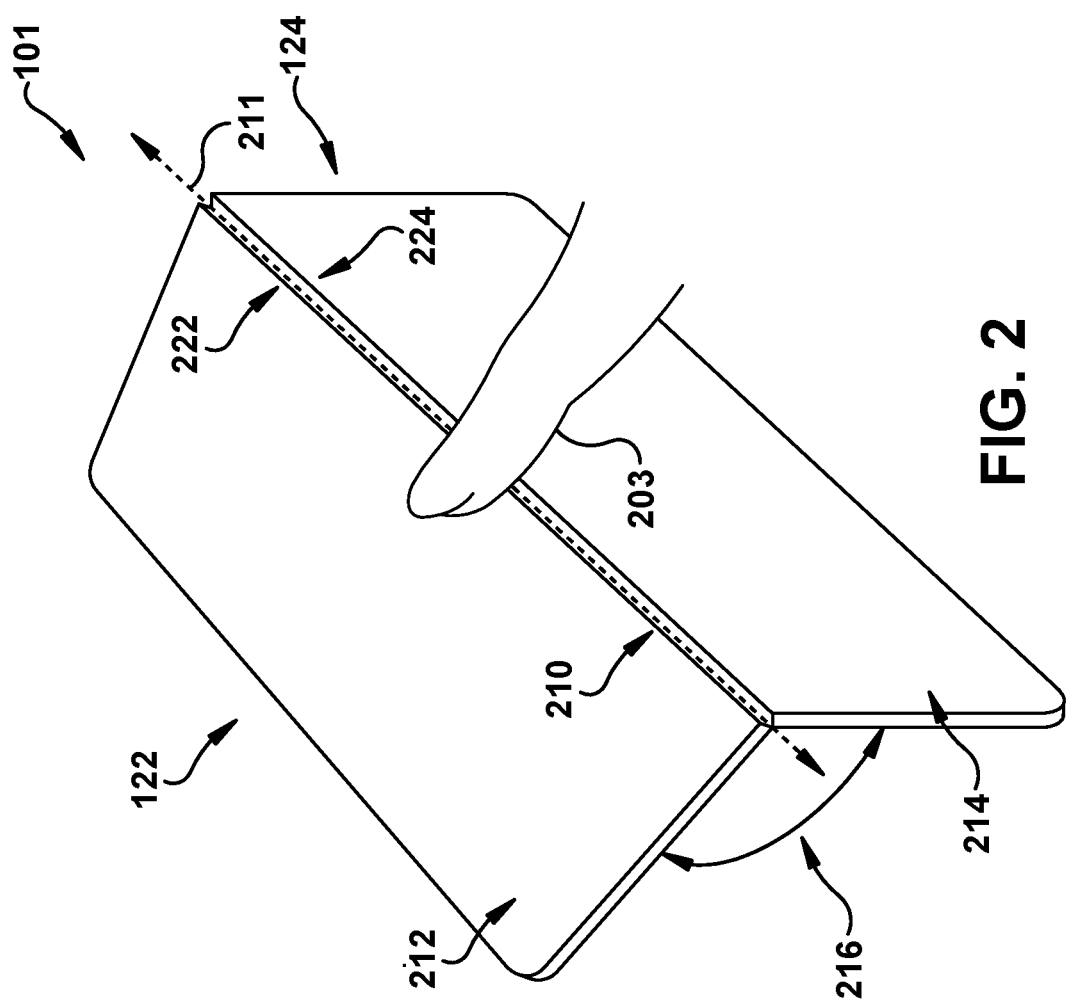
FIG. 2 illustrates an example device, in accordance with one or more embodiments described herein.

Turning briefly to FIG. 2, the mobile device 101 (e.g., relative to FIG. 1A or FIG. 1B) can comprise a connection system 210, such as a hinge system or other tethering system that can allow for limited adjustability of the first display screen portion 122 and the second display screen portion 124 relative to one another. The connection system 210 can allow for pivoting of the screen portions 122 and 124 relative to one another, such as about a pivot axis 211 extending between, and parallel to, a first edge 222 of the first display screen portion 122 and a second edge 224 of the second display screen portion 124. An angle 216 can be formed between the display screen portions 122 and 124, and more particularly between a first surface 212 of the first display screen portion 122 and a second surface 214 of the second display screen portion 124. That is, the angle 216 can be determined as a function of the pivot axis 211 by an interface component 116 of the modelling output system 102, to be described below. For example, the connection system 210 can comprise one or more sensors for determining data representing a position and/or alignment of the connection system 210.

In one or more embodiments, adjustment of the connection system 210 can be facilitated by a mechanical element, such as a magnet, knob, slide, controller, switch, etc.

In one or more embodiments, such connection system can be more minimal, such as where the connection system is not employed to control the angle 216 and/or where two or more of the display screen portions are not connected to one another. As one non-limiting example, two or more display screen portions can be communicatively connected to allow for determination of one or more angles between the two or more display screen portions, such as using any suitable one or more sensors.

In one or more embodiments, at least one of the first surface 212 or the second surface 214 can be a curved surface.

The surfaces 212 and 214 can be the same size (e.g., being symmetrical) or one surface 212, 214 can have a size that is different from the other surface 212, 214.

In one or more embodiments, more than two display screen portions can be configured to function relative to one another, with or without a physical connection system any two or more of the two or more display screen portions.

Tuning back to FIG. 1A and to the components of the modelling output system 102, comprised can be a display component 114, interface component 116, detection component 118, action component 120, processor 106, memory 104, and/or bus 105. It is noted that the discussion below regarding these components also is applicable to FIG. 1B and is not repeated directly relative to FIG. 1B for sake of brevity.

One or more communications between one or more components of the non-limiting system 100 and/or the modelling output system 102 can be provided by wired and/or wireless means including, but not limited to, employing a cellular network, a wide area network (WAN) (e.g., the Internet), and/or a local area network (LAN). Suitable wired or wireless technologies for providing the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol, and/or other proprietary and/or non-proprietary communication protocols.

Discussion now turns to the processor 106, memory 104, and bus 105 of the modelling output system 102.

For example, in one or more embodiments, the modelling output system 102 can comprise a processor 106 (e.g., computer processing unit, microprocessor, classical processor, and/or like processor). In one or more embodiments, a component associated with the modelling output system 102, as described herein with or without reference to the one or more figures of the one or more embodiments, can comprise one or more computer and/or machine readable, writable, and/or executable components and/or instructions that can be executed by processor 106 to provide performance of one or more processes defined by such component(s) and/or instruction(s). In one or more embodiments, the processor 106 can comprise the display component 114, interface component 116, detection component 118 and/or action component 120.

In one or more embodiments, the modelling output system 102 can comprise a computer-readable memory 104 that can be operably connected to the processor 106. The memory 104 can store computer-executable instructions that, upon execution by the processor 106, can cause the processor 106 and/or one or more other components of the modelling output system 102 (e.g., the display component 114, interface component 116, detection component 118 and/or action component 120) to perform one or more actions. In one or more embodiments, the memory 104 can store computer-executable components (e.g., the display component 114, interface component 116, detection component 118 and/or action component 120).

The modelling output system 102 and/or a component thereof as described herein, can be communicatively, electrically, operatively, optically, and/or otherwise coupled to one another via a bus 105 to perform functions of non-limiting system 100, modelling output system 102 and/or one or more components thereof and/or coupled therewith. Bus 105 can comprise one or more of a memory bus, memory controller, peripheral bus, external bus, local bus, and/or another type of bus that can employ one or more bus architectures. One or more of these examples of bus 105 can be employed to implement one or more embodiments described herein.

In one or more embodiments, the modelling output system 102 can be coupled (e.g., communicatively, electrically, operatively, optically, and/or like function) to one or more external systems (e.g., a non-illustrated electrical output production system, one or more output targets, an output target controller, and/or the like), sources and/or devices (e.g., computing devices, communication devices, and/or like devices), such as via a network. In one or more embodiments, one or more of the components of the modelling output system 102 can reside in the cloud, and/or can reside locally in a local computing environment (e.g., at a specified location(s)).

In one or more embodiments, the modelling output system 102 can function as, comprise, or be comprised as part of, a distributed system. That is, a service, software, code, microservice, application and/or the like can be downloaded to one or more devices each comprising a display screen portion. One of the devices can function as a centralized or parent device. A virtual or physical connection can be employed between the two or more display screen portions to allow for determination of the one or more angles 216 between the two or more display screens. In one or more embodiments, the physical connection can be a connection system 210.

In addition to the processor 106 and/or memory 104 described above, modelling output system 102 can comprise one or more computer and/or machine readable, writable, and/or executable components and/or instructions that, when executed by processor 106, can provide performance of one or more operations defined by such component(s) and/or instruction(s).

Figure 3:
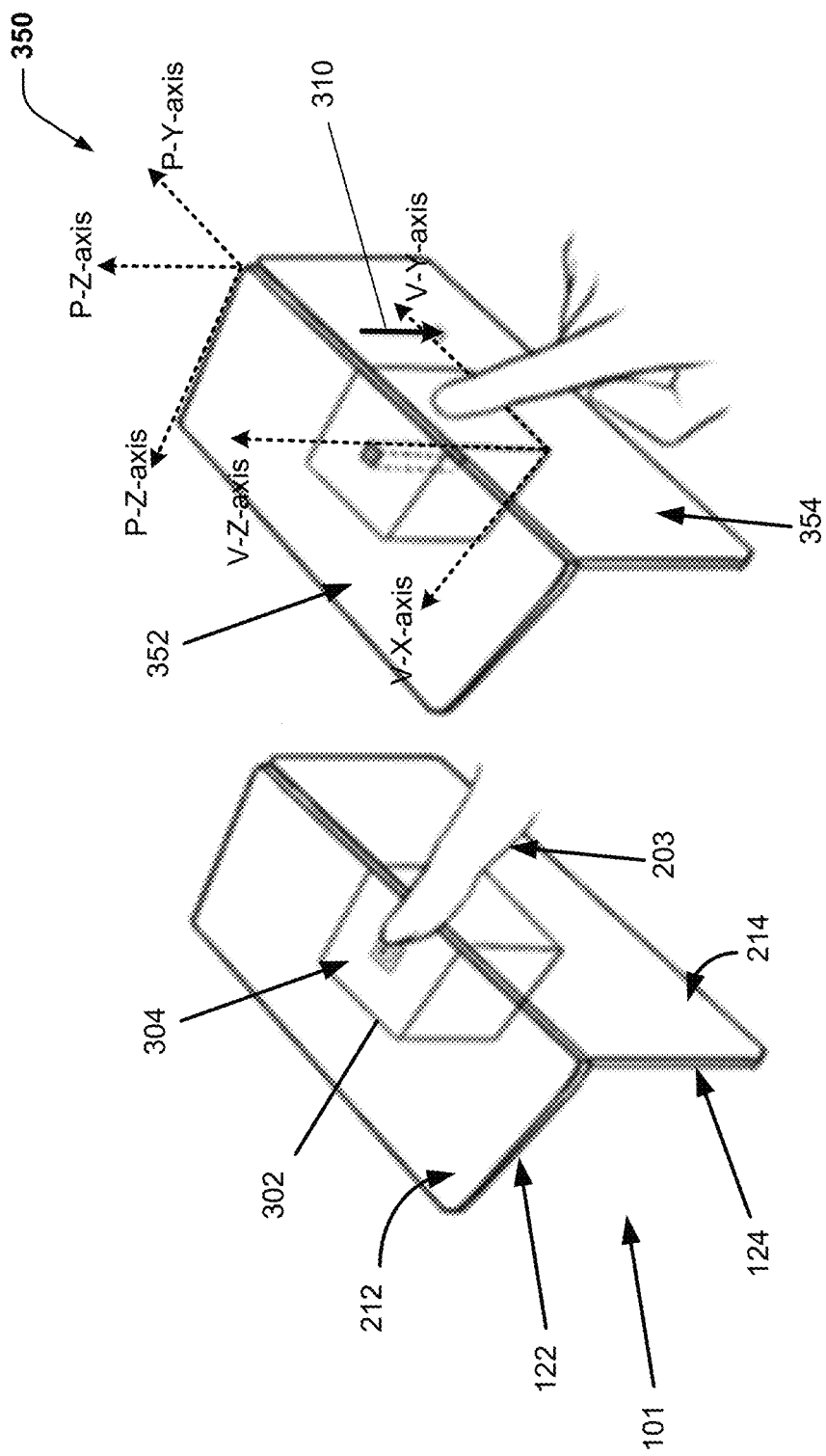
FIG. 3 provides another pair of illustrations of the device of FIG. 2, in accordance with one or more embodiments described herein.

Turning first now to the display component 114 and also to FIG. 3, this component can generally generate a virtual content 302 at each screen portion of the pair of screen portions 122 and 124. As used herein, a term "virtual content" refers to a non-physical content displayed on a display device by the display component 114. That is a first respective portion of the virtual content 302 can be generated and displayed, e.g., by the display component 114, at the first display screen portion 122 and a second respective portion of the virtual content 302 can be generated and displayed, e.g., by the display component 114, at the second display screen portion 124.

Generating and displaying the virtual content 302 can comprise representing the virtual content 302 in a virtual environment (e.g., generated by the display component 114) as extending along virtual components of each of virtual X-, Y- and Z-axes (e.g., V-X, V-Y and V-Z axes at image 350 of FIG. 3) that align to physical components of each of physical X-, Y- and Z-axes (e.g., P-X, P-Y and P-Z axes at image 350 of FIG. 3). The physical X-, Y- and Z-axes are defined by a respective intersecting first surface plane 352 of the first display screen portion 122 and second surface plane 354 of the second display screen portion 124 depending on the angle 216 between the pair of display screen portions 122 and 124 (e.g., more particularly between the first surface 212 having the first surface plane 352 and second surface 214 having the second surface plane 354). It is noted that the first surface plane 352 and the second surface plane 354 can be considered to intersect, such as at the pivot axis 211.

The display component 114 can facilitate the surface-based easy and efficient manipulation of the modelling output system 102. For example, the display component 114 can generate and display the virtual content 302 as being aligned along either the first surface plane 352 or the second surface plane 354. As used herein, "along" can refer to a feature of the virtual content 302 being aligned spaced from or directly at (e.g., contiguous with and/or intersecting) the respective surface plane 352 or 354. The feature of the virtual content 302 can be a point, edge or plane defining part of a three-dimensional shape of the virtual content 302.

Likewise, the display component 114 also can generate and display a second respective portion of the virtual content 302 as being determined as a function of the angle 216, which second respective portion is displayed along the other of the first surface plane 352 and second surface plane 354. In one or more embodiments, to facilitate direct manipulation at a surface 212, 214 of the device 101, the display component 114 can virtually align the aforementioned feature of the first part of the virtual content 302 at (e.g., intersecting and/or contiguous with) the respective surface plane (e.g., the first surface plane 352 of the first surface 212 of the first display screen portion 122). While it is also possible for the display component 114 to display the first and/or second respective portions differently (e.g., offset from, transverse to, at an angle to the surface planes 352, 254), the surface-based alignment approach of the modelling output system 102 can provide for easy and efficient use of the modelling output system 102 by a user entity.

For example, as illustrated at FIG. 3, in one or more cases, based on the sensor input, such as relative to the connection system 210 (e.g., from one or more of the sensors 126) or relative to any other physical or non-physical communicative connection between the display screen portions, the display component 114 can virtually display the virtual content 302, where a plane of the virtual content 302 is virtually displayed parallel to, contiguous with, non-parallel to: transverse to or at a specified angle to, at a specified distance from, or in, the surface plane (e.g., second surface plane 354 of the second display screen portion 124) while maintaining alignment of the aforementioned feature of the virtual content 302 along the other surface plane (e.g., along the first surface plane 352 of the first display screen portion 122).

In one or more embodiments, one or more features of the virtual content 302 can be maintained along both the first surface plane 352 and the second surface plane 354. That is, the virtual content 302 can be aligned at both display screen portions 122 and 124. Put one way, the virtual content 302 can be aligned directly at both of the respective surface planes 352 and 354 simultaneously. That is, a same feature of the virtual content 302 can be aligned directly at respective surface planes 352 and 354 simultaneously, or different features of the virtual content 302 can be directly aligned at the different surface planes 352 and 354 simultaneously.

Turning next to the interface component 116, this component generally can, based on sensor input (e.g., from the connection system 210 and/or one or more sensors 126), determine the angle 216 between the pair of display screen portions 122 and 124. Information regarding the angle 216 can be made available for and/or transmitted to the display component 114 and/or action component 120 for use by these components.

In one or more embodiments, a pair of separate computing devices can separately comprise the display screen portions 122 and 124, and each of the separate computing devices can comprise one or more sensors 126.

In one or more embodiments, the angle 216 can be at least partially determined by employing an inertial motion sensor at one or both of the display screen portions 122, 124, where data from the inertial motion sensor can be employed by the interface component 116.

In one or more embodiments, the angle 216 can be at least partially determined by employing a camera sensor fixedly disposed relative to at least one of the display screen portions 122, 124 to determine placement of the other of the display screen portions relative thereto. In one or more embodiments, a first camera sensor can be fixedly disposed relative to the first display screen portion 122 and a second camera sensor can be fixedly disposed relative to the second display screen portion 124, and both camera sensors can be employed to determine their relative location. That is, data from the one or more camera sensors can be employed by the interface component 116.

It will be appreciated that each of the first display screen portion 122 and second display screen portion 124 can directly comprise one or more sensors 126 (e.g., tactile and/or capacitive) to facilitate the processes of the detection component 118.

It is noted that from any one or more of the one or more sensors 126 and/or from the connection system 210 can be employed separately or in any suitable combination by the interface component 116 to determine the relative position of any display screen portion relative to another display screen portion or relative to an environment around the display screen portions.

For example, the above-noted feature can be employed by the interface component 116 to determine a position of the device 101 (e.g., of any computing device thereof or of any display screen portion thereof) relative to a workpiece 190 on which the virtual content 302 can be based. Likewise, the interface component 116 can employ the data from one or more of the one or more sensors 126 and/or from the connection system 210 to aid the display component 114 in generating the virtual content 302 as representing the workpiece 190.

In one or more embodiments, the interface component 116 can, employing the sensors 126 and/or connection system 210, determine that the angle 216 is greater than or less than 0 degrees. This information can be employed by the display component 114 for virtually aligning at least one feature of the virtual content 302 along the respective surface plane of the first display screen portion 122 or the second display screen portion 124.

In one or more embodiments, based on a determination of the angle 216, the interface component 116 can notify and/or direct one or emitters 128 to generate feedback (e.g., tactile feedback) when the first surface 212 of the first display screen portion 122 and the second surface 214 of the second display screen portion 124 are aligned at one or more selected angles relative to one another (e.g., where the angle 216 is equal to 0 degrees, 45 degrees and/or 90 degrees and/or an absolute value thereof).

Referring now to the detection component 118, this component generally can receive manipulation user input, such as being audible, tactile and/or capacitive for directing manipulation of the virtual content at the first display screen portion 122 and/or the second display screen portion 124. For example, recognizing a touch manipulation input (e.g., tactile and/or capacitive) at one or more both of the display screen portions 122, 124, the detection component can make available and/or transmit to the display component 114 and/or action component 120 information regarding details of the manipulation input. In one or more embodiments, the detection component 118 can specify information regarding the manipulation input as a function of the angle 216. For example, while manipulation input may be along one axis or plane relative to the first surface plane 352, the manipulation input can be along a different axis or plane relative to the second surface plane 354 where the angle 216 is other than 0 degrees.

Figure 4:
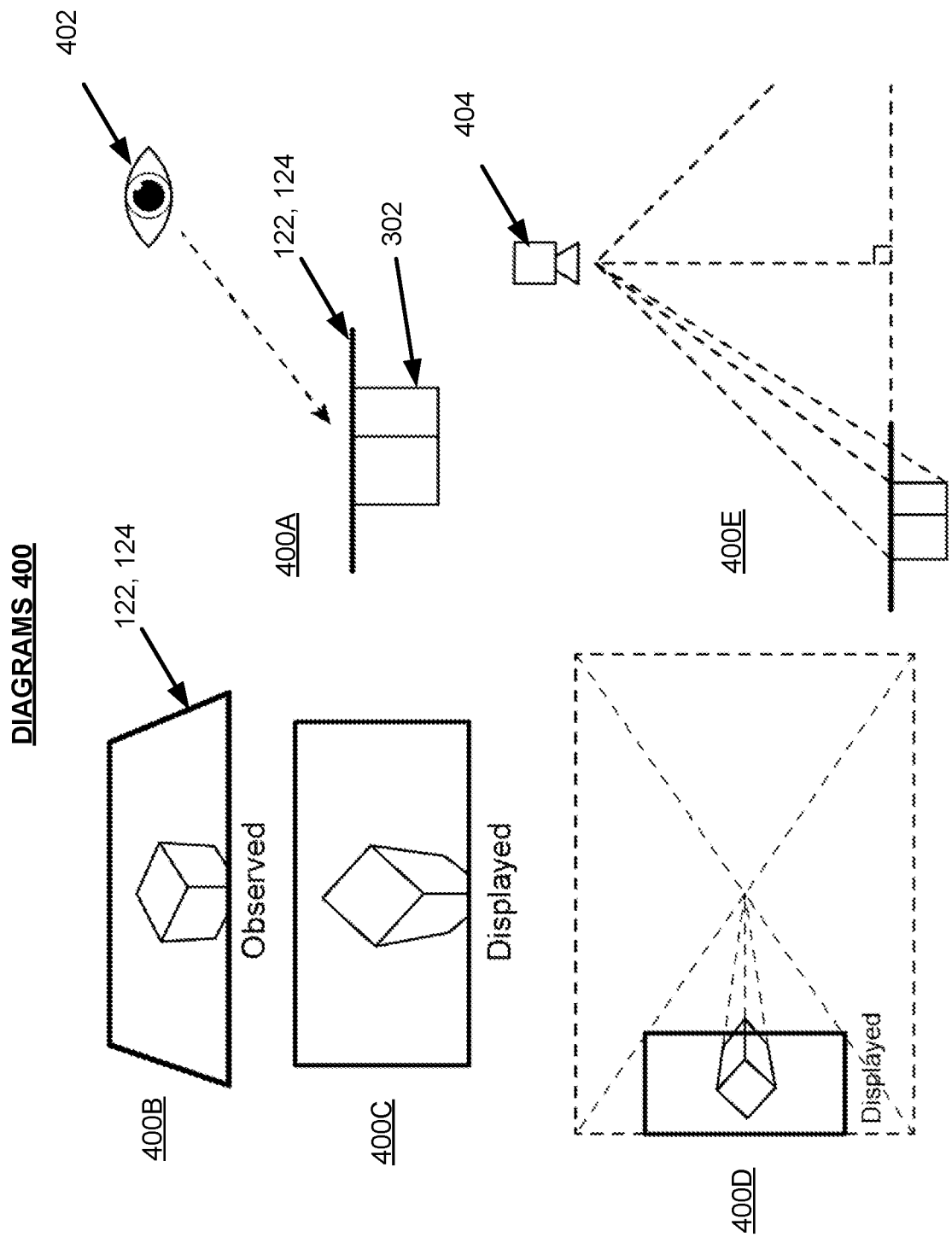
FIG. 4 provides a set of diagrams illustrating different view types that can be displayed by the modelling output system of FIG. 1A or FIG. 1B, in accordance with one or more embodiments described herein.

Turning next to FIG. 4, in one or more embodiments, the display component 114, based on output from the detection component 118 (e.g., being input to the display component 114) facilitate direct and/or perspective viewing of the virtual content 302. As illustrated at each of the diagrams 400, the virtual content 302 is snapped to (e.g., a planar feature of the virtual content 302 is virtually aligned at, and is co-planar with, the surface plane 352, 354 of) the display screen portion 122, 124. In this way, the low skill barrier can be facilitated by simulating a real-world object, such as by snapping one or more surfaces of the 3D model being manipulated to a surface of a display of the device 101, or otherwise aligning the one or more surfaces of the 3D model relative to the surface of the display (e.g., parallel to, contiguous with, non-parallel to, transverse to, at a specified angle to, etc.).

As illustrated at diagram 400A of FIG. 4, a perspective view of a display screen portion 122, 124 can be facilitated by displaying (e.g., by the display component 114) the virtual content 302 in a skewed or perspective format as illustrated at 400C, which based on the actual location of a user entity visual element (e.g., an eye 402 at diagram 400A) can be observed as being non-skewed or non-perspective based, as illustrated at diagram 400B. In one or more embodiments, this can be described as implementing an off-axis projection technique (e.g., using a skewed frustrum) for each display screen portion 122, 124.

Diagrams 400D and 400E illustrate additional views of a similar projection technique that employs a fixed viewing position (e.g., corresponding to the camera 404) but still allowing for perspective viewing.

Put another way, to facilitate this projection technique, the display component 114, based on output of the detection component 118, can generate the virtual content 302 with at least one of the virtual components of the virtual X-, Y- or Z-axes being a perspective axis relative to other virtual components of the virtual X-, Y- or Z-axes other than the at least one of the virtual components. In this way, the display component 114 can generate and display at least one other feature of the virtual content 302 according to a perspective view, defined according to the angle 216, relative to the feature that is aligned along the respective surface plane of the respective display screen portion.

In one or more embodiments, as the user entity visual element (e.g., eye 402) moves relative to the device 101 the detection component 118 can facilitate, via one or more sensors 126 (e.g., visual or infrared) tracking a facial movement of a face of a user entity associated with the device 101, based on movement of the face of the user entity relative to a defined point of reference fixed relative to the device 101. Based on the facial movement and the angle 216, the detection component 118 can make available, transmit and/or otherwise provide information to the display component 114 to facilitate a generation and displaying of a first movement of the first part (e.g., at the first display screen portion 122) of the virtual content 302 corresponding to the facial movement and a second movement of the second part (e.g., at the second display screen portion 124) of the virtual content 302 also corresponding to the facial movement. That is, the projection technique can be continually adjusted based on the facial movement and the angle 216.

Figure 5:
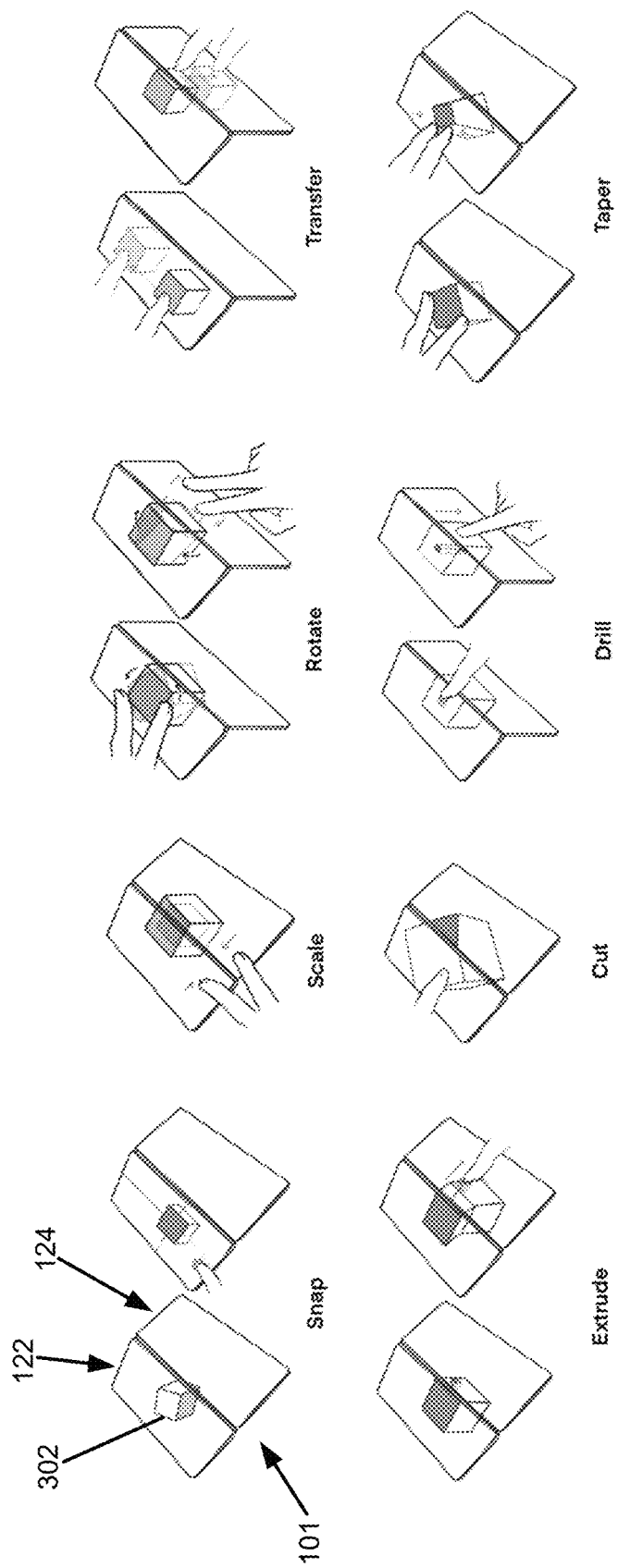
FIG. 5 provides a set of diagrams illustrating different uses of the modelling output system of FIG. 1A or FIG. 1B, in accordance with one or more embodiments described herein.

Referring next to FIGS. 3 and 5, in connection with output of the detection component 118, the action component 120 can facilitate and provide input to the display component 114 for generating and displaying one or more manipulations as actions/manipulations of the virtual content 302. As illustrated at FIG. 5, these manipulations can include, without being limited thereto, snap, scale, rotate, transfer, extrude, cut, drill and/or taper manipulations of the virtual content 302. Any one or more of these manipulations, without being limited thereto, can be performed at both of the display screen portions 122, 124 at least partially simultaneously.

As used herein, cut can refer to removing a part of the model, surface or edge of the virtual content 302. Extrude can refer to an action of pulling inward or outward, relative to a surface 212, 214, a feature of the virtual content 302. Drilling can refer to a type of extrusion action, for a defined shape of hole. Size adjustment (e.g., scaling) and/or orientation adjustment (e.g., rotate or transfer) can be additional manipulations. Taper can refer to deforming a feature of the virtual content 302 to a selected size. Translate can refer to dragging of the virtual content 302 (e.g., sliding). Rotating can refer to rotation of the virtual content 302 about a virtual axis or component of a virtual axis. A project function can create or modify a shape of the virtual content 302 based on a projected object. A shell function can remove a surface of a model, change a thickness of a model, or make a model hollow. A bevel function can adjust a feature of a surface for hard or soft edges or corners. A fillet function can provide a continuous or non-sharp transition between surfaces.

Regarding the snap function, one or both of the surface planes 352, 354 can serve as manipulation planes where a feature of the virtual content 302 is snapped to such surface plane 352, 354. As used herein, snapping can refer to the feature intersecting or being contiguous or coincident with the surface plane 352, 354. In one example, a virtual content 302 feature can be aligned to one surface 212, 214 (e.g., snapped) while a manipulation can be performed at the other surface 212, 214 via a manipulation input. In another example, different or same virtual content features or feature can be snapped to both surfaces 212, 214, and a manipulation can be performed at one or more surfaces 212, 214.

To perform one or more of these manipulations, the user entity can apply a manipulation input 304, such as via a touching element 203 (e.g., a finger, digit, tool, etc.) at a location of one of the surface planes 352, 354 corresponding to the virtual content 302. In such case, a manipulation can be facilitated by a one digit (e.g., finger) or multi-digit manipulation. In response to the applied manipulation input 304, and based on the orientation of the first surface 212 and the second surface 214 relative to one another, the action component 120 can make available and/or transmit information to the display component 114 defining how to modify the virtual content 302.

In one or more embodiments, either in addition to or in alternative to a touch manipulation, one or more of these manipulations can be triggered by a movement of a user entity, such as a hand or other extremity gesture, eye movement, etc. for allow for intuitive manipulation of the virtual content 302 at the surfaces 212, 214.

One or more descriptions will now be provided regarding one or more manipulations of the virtual content 302 relative to the first surface 212 or the second surface 214 of the device 101. It will be appreciated that where a description is provided relative to one of the surfaces 212, 214, such description can likewise apply oppositely, such as to the other one of the surfaces 212, 214.

For example, referring still to FIGS. 3 and 5, the modelling output system 102 can virtually move the first part of the virtual content 302 about or along a first virtual axis that extends transverse to (e.g., not co-planar with) the second surface plane 354 of the second display screen portion 124 or virtually move the second part of the virtual content 302 about or along a second virtual axis that extends transverse to the first surface plane 352 of the first display screen portion 122. That is, the action component 120 can define and the display component 114 can generate and display the virtual movement. It is appreciated that the modelling output system 102 likewise can move the virtual content 302 in or along one of the surface planes 352, 354 where applicable.

In another example, the modelling output system 102 can virtually manipulate the virtual content 302 along a virtual axis that extends transverse (e.g., not co-planar with the surface plane 352) to the first surface plane 352. That is, this virtual manipulation is defined as a function of the angle 216. That is, the action component 120 can define and the display component 114 can generate and display the virtual movement. This virtual axis can be the V-Z axis or any component of this virtual axis or any other virtual axis not co-planar with the first surface plane 352. For example, the virtual axis that extends transverse to the first surface plane 352 can extend orthogonal to the first surface plane 352.

In another example, the modelling output system 102 can virtually align at least one feature of the virtual content 302 along the respective surface plane 354 of the second display screen portion 124, and/or along the respective surface plane 352 of the first display screen portion 122, and in response to receiving user input 304 manipulating the virtual content 302 at or along the respective surface plane 352, 354 of the other display screen portion 122, 124, alter the visual content while maintaining alignment of the feature at the respective surface plane 352, 354. That is, the action component 120 can define and the display component 114 can generate and display the virtual movement/alteration. As noted above, the virtually manipulating can comprise a virtual manipulation action including, but not limited to, extruding, drilling, cutting or tapering, while displaying a result of the virtual manipulating of the virtual content 302 via the other display screen portion 122, 124.

In one or more embodiments, direct manipulation of at least one feature of the virtual content 302, which feature is viewable via one of the surfaces 212, 214, is not capable via manipulation at or along the other surface 212, 214. This can be due to the snapping of a virtual content feature to the other surface 212, 214. For example, looking to FIG. 3, manipulation input along a direction 310 at the second surface 214 can be not viewable or allowed at the first surface 212, such as where a feature of the virtual content 302 (e.g., a top plane of the virtual content 302) is aligned with, such as being snapped to, the first surface 212.

Figure 6A:
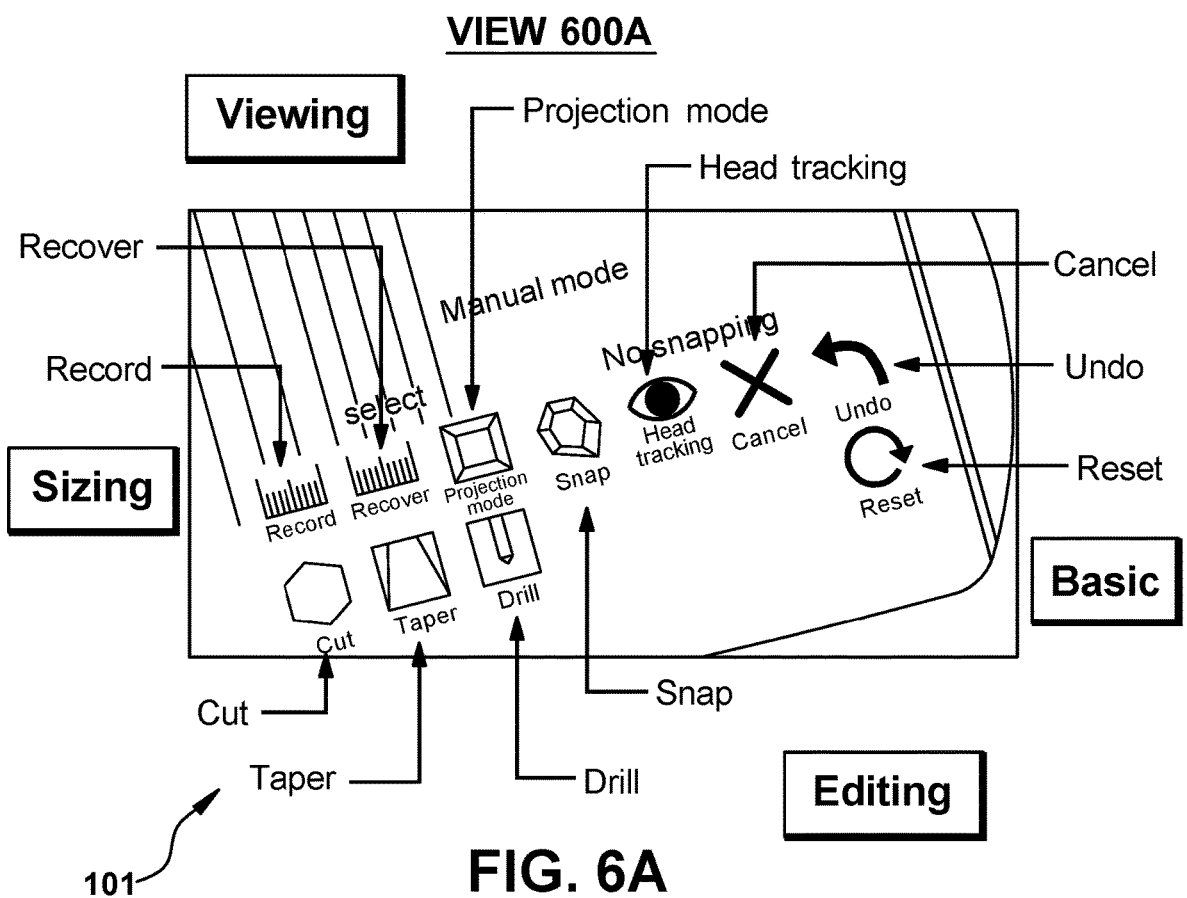
FIG. 6A provides a first diagram illustrating a graphical user interface to facilitate use of the modelling output system of FIG. 1A or FIG. 1B, such as on a device of FIG. 2, in accordance with one or more embodiments described herein.
Figure 6B:
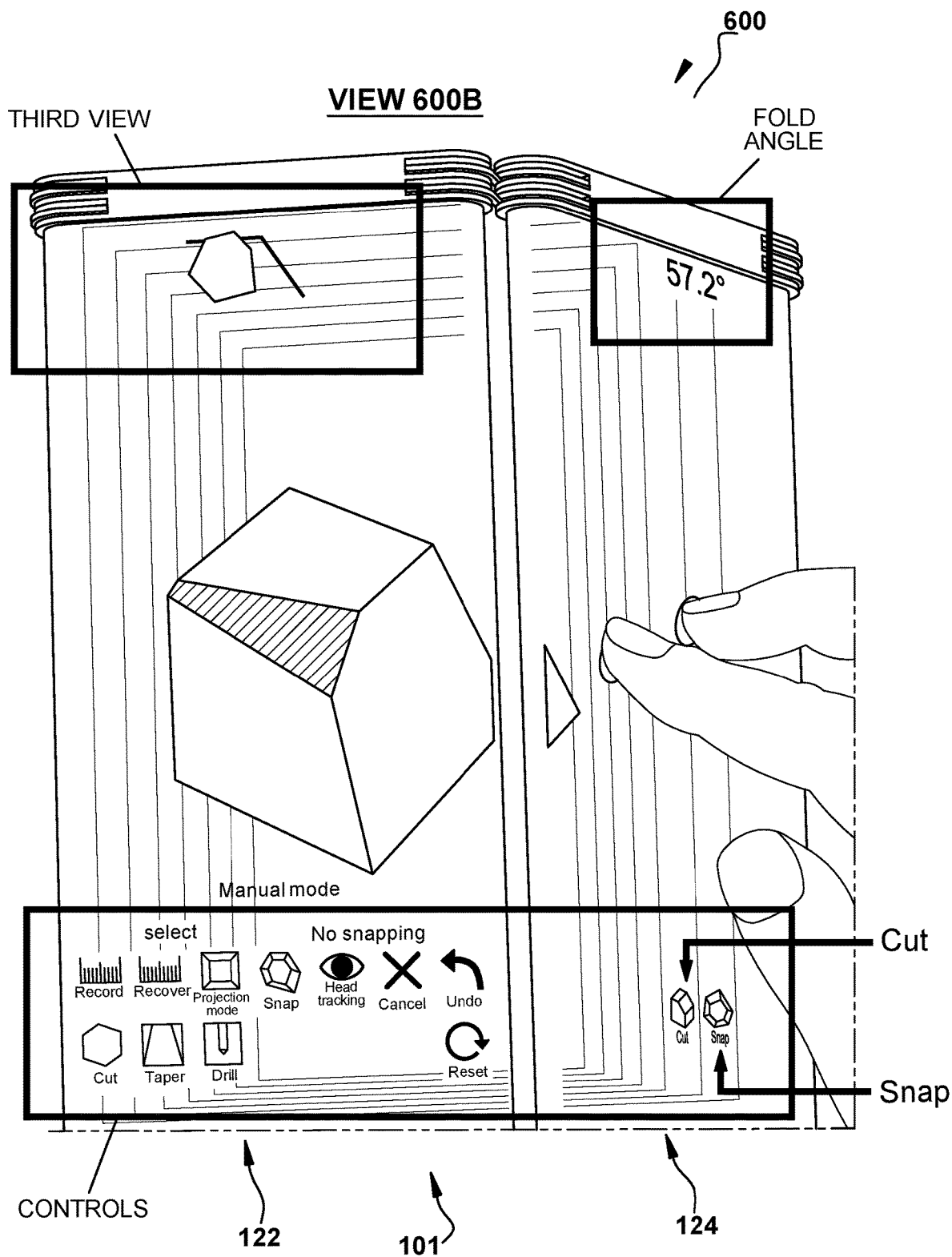
FIG. 6B provides a second diagram illustrating a graphical user interface to facilitate use of the modelling output system of FIG. 1A or FIG. 1B, such as on a device of FIG. 2, in accordance with one or more embodiments described herein.

Turning now to FIG. 6, illustrated is but one non-limiting graphical user interface (GUI) 600 for facilitating the virtual 3D modelling of the modelling output system 102 at the device 101. As illustrated at view 600B, the GUI can comprise indication of the fold angle 216, can provide an addition picture-in-picture view as a third view, and can comprise a plurality of different controls. These different elements can functionally be displayed (e.g., by the display component 114) at one or both of the display screen portions 122, 124 of the device 101. As illustrated at view 600A, without being limited thereto, the controls of the GUI 600 can comprise icons for one or more of the different manipulations illustrated at FIG. 5 (e.g., as shown at view 600A), and/or for one or more additional function such as recover measure, record measure, reset function, undo function and/or cancel function.

In one or more other embodiments, and as mentioned above, one or more system functions can be facilitated by a gesture, such as by a hand gesture with or without touch input (e.g., capacitive or tactile) to the device 101. Instead, such system function can be facilitated by a sensor 126, such as a visual or infrared sensor.

In one or more embodiments, a function of the GUI can allow for changing between orthogonal and perspective modes of viewing. An orthogonal mode can refer to rendering an orthogonal 2D project of a 3D virtual content on a screen. A perspective mode can refer to rendering a virtual content in 3D, with a view changing relative to a viewing point, e.g., relative to description corresponding to FIG. 4, provided above.

In one or more embodiments, a function of the GUI can allow for changing between a fixed camera view and face tracking, as described above relative to the different diagrams 400 of FIG. 4.

In one or more embodiments, a function of the GUI can be a third view, which can refer to display (e.g., by the display component 114) of a 2D view that shows an orthogonal projection of how the virtual content 302 looks form a direction perpendicular to both surfaces 212, 214. This third view can be updated with adjusting relative position of the two surfaces 212, 214.

Turning now to a brief in-use discussion, it is noted that where the modelling output system 102 is employed with a workpiece 190, a change made to the workpiece 190 can be virtually represented by the display component 114. In a case where a user entity has made a change to the workpiece 190 based on a virtual manipulation of the virtual content 302 as described above, the display component further can overlay the previous virtual manipulation result and the workpiece 190 result. This overlay can comprise a determination, either in visual figure representation or text, of whether the physical change to the workpiece 190 meets or satisfies the previous virtual manipulation. For example, if a portion of the workpiece 190 was not changed according to the previous virtual manipulation, such portion of the virtual content 302 can be highlighted to aid the user entity in modifying the workpiece 190.

Example Methods of Use

Figure 7:
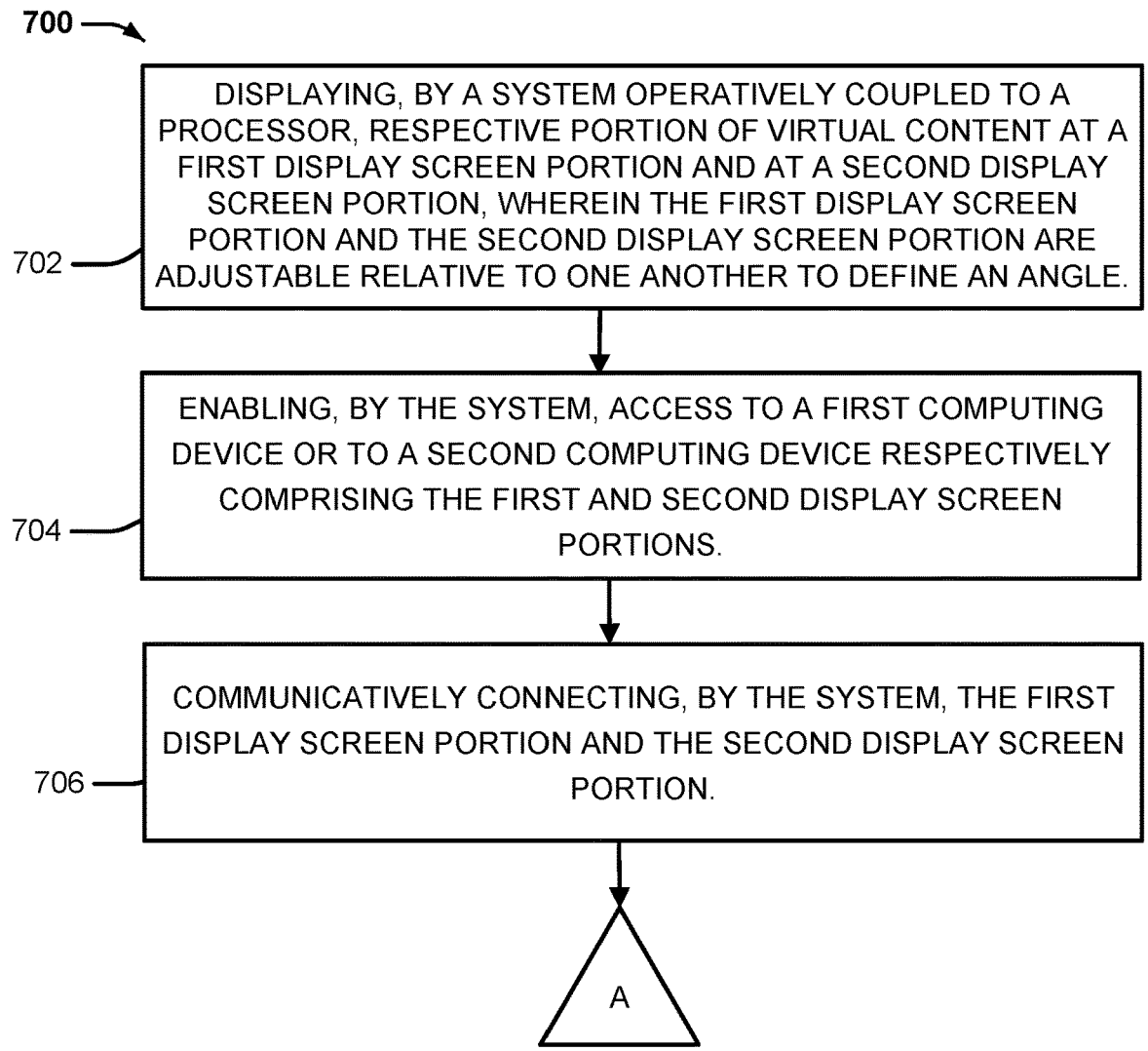
FIG. 7 illustrates a process flow of a method of use of the modelling output system of FIG. 1, in accordance with one or more embodiments described herein.
Figure 8:
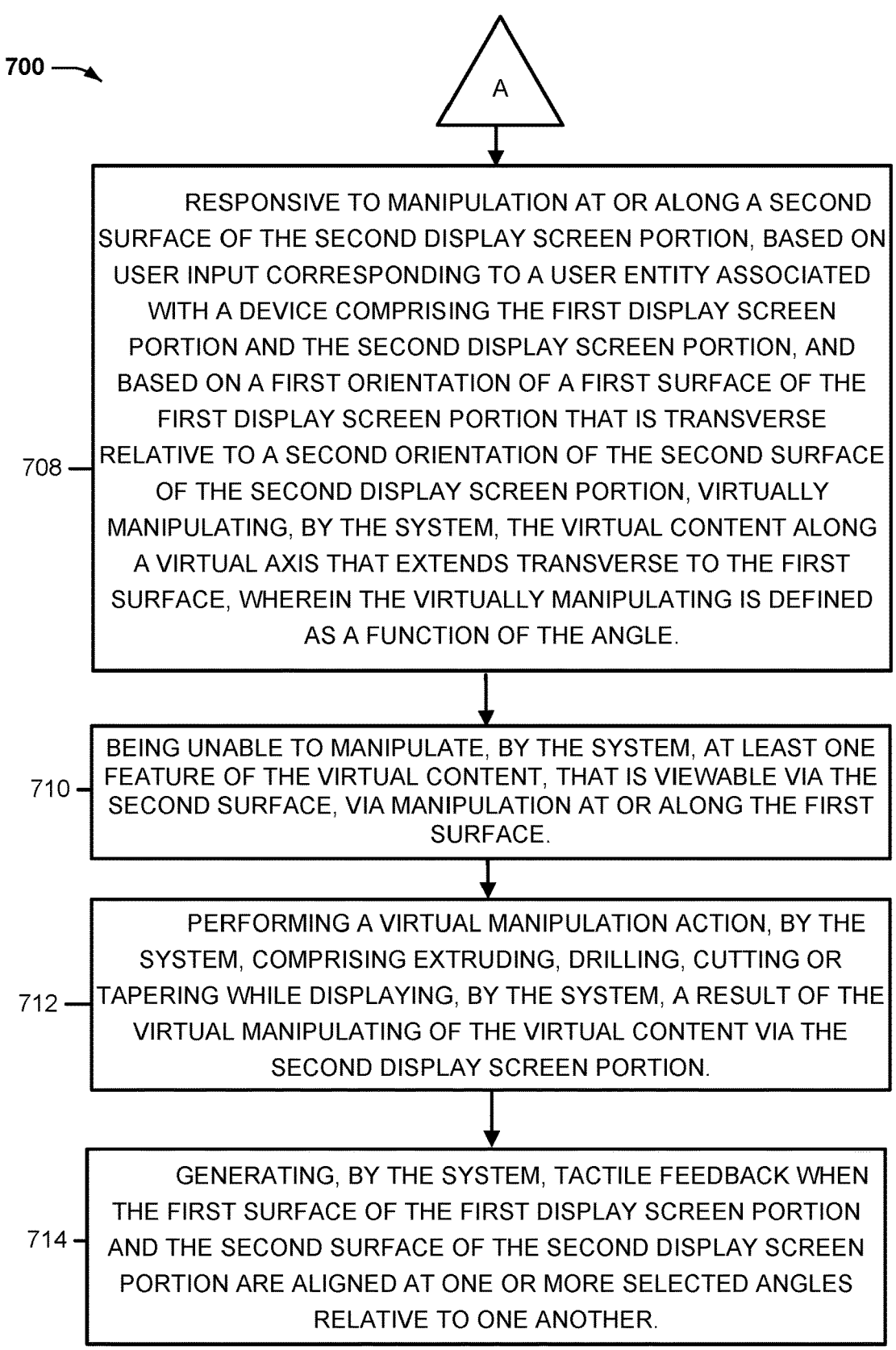
FIG. 8 illustrates a continuation of the process flow of FIG. 7 of a method of use of the modelling output system of FIG. 1A or FIG. 1B, in accordance with one or more embodiments described herein.

Turning now to FIGS. 7 and 8, illustrated is a flow diagram of an example, non-limiting method 700 that can facilitate a process to display and allow manipulation of a 3D model at a device comprising a pair of display screen portions that together provide a single extended display. Repetitive description of like elements and/or processes employed in respective embodiments is omitted for sake of brevity.

Looking first to operation 702 at FIG. 7, the non-limiting method 700 can comprise displaying, by a system operatively coupled to a processor (e.g., display component 114), respective portion of virtual content at a first display screen portion (e.g., display screen portion 122) and at a second display screen portion (e.g., display screen portion 124), wherein the first display screen portion and the second display screen portion are adjustable relative to one another to define an angle.

At operation 704, the non-limiting method 700 can comprise enabling, by the system (e.g., processor 104 and/or interface component 114), access to a first computing device (e.g., first computing device 103A) or to a second computing device (e.g., second computing device 103B) respectively comprising the first and second display screen portions.

At operation 706 the non-limiting method 700 can comprise communicatively connecting, by the system (e.g., interface component 114), the first display screen portion and the second display screen portion.

At operation 708, the non-limiting method 700 can comprise, responsive to manipulation at or along a second surface of the second display screen portion, based on user input corresponding to a user entity associated with a device comprising the first display screen portion and the second display screen portion, and based on a first orientation of a first surface of the first display screen portion that is transverse relative to a second orientation of the second surface of the second display screen portion, virtually manipulating, by the system (e.g., action component 120), the virtual content along a virtual axis that extends transverse to the first surface, wherein the virtually manipulating is defined as a function of the angle.

At operation 710, the non-limiting method 700 can comprise being unable to manipulate, by the system (e.g., action component 120), at least one feature of the virtual content, that is viewable via the second surface, via manipulation at or along the first surface.

At operation 712, the non-limiting method 700 can comprise performing a virtual manipulation action, by the system (e.g., action component 120), comprising extruding, drilling, cutting or tapering while displaying, by the system (e.g., display component 114), a result of the virtual manipulating of the virtual content via the second display screen portion.

At operation 714, the non-limiting method 700 can comprise generating, by the system (e.g., interface component 116), tactile feedback when the first surface of the first display screen portion and the second surface of the second display screen portion are aligned at one or more selected angles relative to one another.

Figure 9:
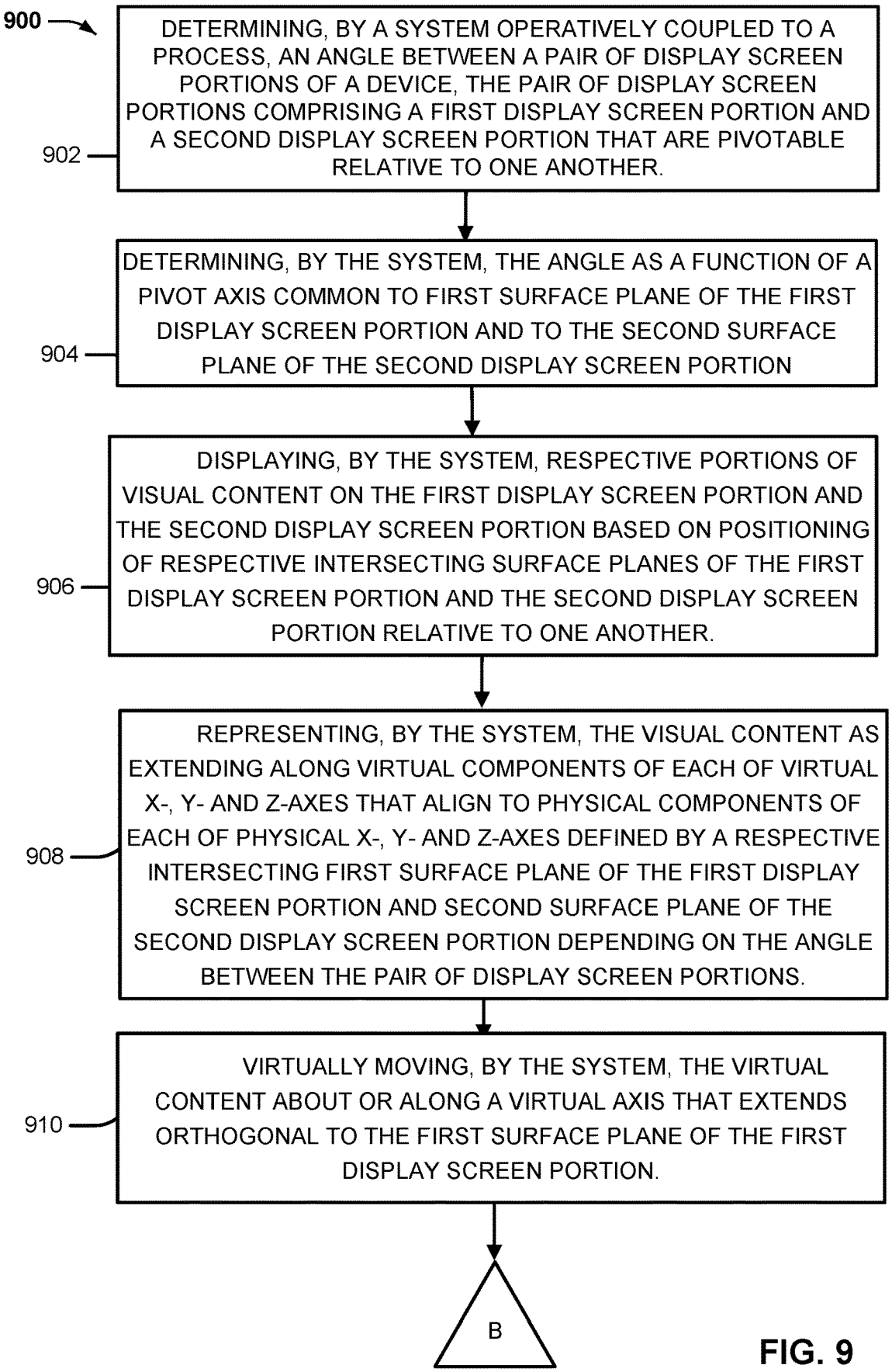
FIG. 9 illustrates another process flow of a method of use of the modelling output system of FIG. 1A or FIG. 1B, in accordance with one or more embodiments described herein.
Figure 10:
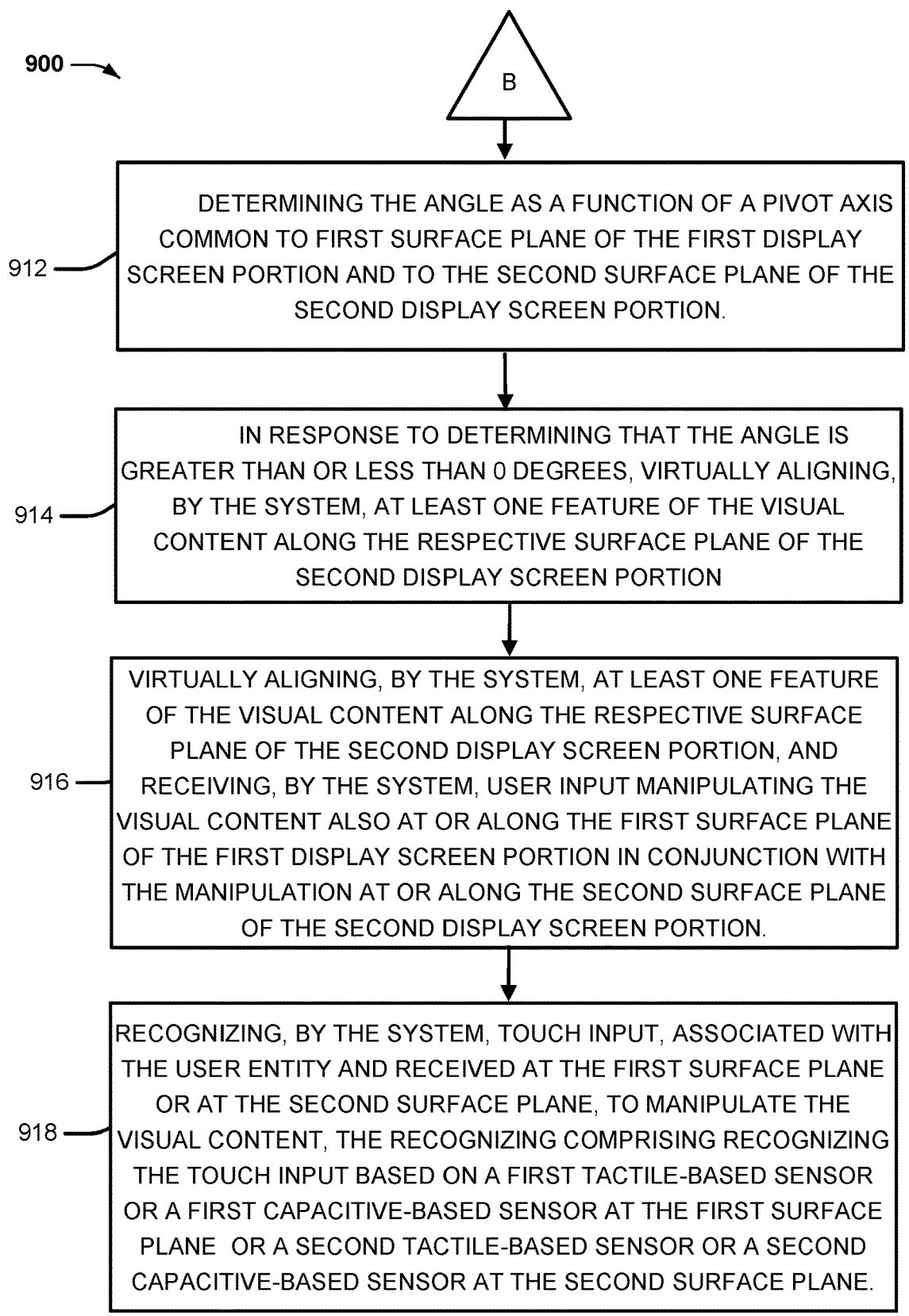
FIG. 10 illustrates a continuation of the process flow of FIG. 8 of a method of use of the modelling output system of FIG. 1A or FIG. 1B, in accordance with one or more embodiments described herein.

Turning now to FIGS. 9 and 10, illustrated is a flow diagram of another example, non-limiting method 900 that can facilitate a process to display and allow manipulation of a 3D model at a device comprising a pair of display screen portions that together provide a single extended display. Repetitive description of like elements and/or processes employed in respective embodiments is omitted for sake of brevity.

Looking first to operation 902 at FIG. 9, the non-limiting method 900 can comprise determining, by a system operatively coupled to a processor (e.g., interface component 116), an angle between a pair of display screen portions (e.g., first display screen portion 122 and second display screen portion 134) of a device, the pair of display screen portions comprising a first display screen portion and a second display screen portion that are pivotable relative to one another.

At operation 904, the non-limiting method 900 can comprise determining, by the system (e.g., interface component 116), the angle as a function of a pivot axis common to first surface plane of the first display screen portion and to the second surface plane of the second display screen portion.

At operation 906, the non-limiting method 900 can comprise displaying, by the system (e.g., display component 114), respective portions of virtual content on the first display screen portion and the second display screen portion based on positioning of respective intersecting surface planes of the first display screen portion and the second display screen portion relative to one another.

At operation 908, the non-limiting method 900 can comprise representing, by the system (e.g., display component 114), the virtual content as extending along virtual components of each of virtual X-, Y- and Z-axes (e.g., V-X, V-Y and V-Z axes at image 350 of FIG. 3) that align to physical components of each of physical X-, Y- and Z-axes (e.g., P-X, P-Y and P-Z axes at image 350 of FIG. 3) defined by a respective intersecting first surface plane (e.g., first surface plane 352) of the first display screen portion and second surface plane (e.g., second surface plane 354) of the second display screen portion depending on the angle (e.g., angle 216) between the pair of display screen portions.

At operation 910, the non-limiting method 900 can comprise virtually moving, by the system (e.g., action component 120), the virtual content about or along a virtual axis that extends orthogonal to the first surface plane of the first display screen portion.

At operation 912, the non-limiting method 900 can comprise determining, by the system (e.g., interface component 116), the angle as a function of a pivot axis common to the first surface plane of the first display screen portion and to the second surface plane of the second display screen portion.

At operation 914, the non-limiting method 900 can comprise, in response to determining that the angle is greater than or less than 0 degrees (e.g., by the interface component 116), virtually aligning, by the system (e.g., display component 114), at least one feature of the virtual content along the respective surface plane of the second display screen portion.

At operation 916, the non-limiting method 900 can comprise, virtually aligning, by the system (e.g., display component 114), at least one feature of the virtual content along the respective surface plane of the second display screen portion, and receiving, by the system (detection component 118), user input manipulating the virtual content also at or along the first surface plane of the first display screen portion in conjunction with the manipulation at or along the second surface plane of the second display screen portion At operation 918, the non-limiting method 900 can comprise, recognizing, by the system (e.g., detection component 118), touch input, associated with the user entity and received at the first surface plane of the first display screen portion or a second surface plane of the second display portion, to manipulate the virtual content, the recognizing comprising recognizing the touch input based on a first tactile-based sensor or a first capacitive-based sensor at the first surface plane of the first display screen portion or a second tactile-based sensor or at the second capacitive-based sensor at the second surface plane of the second display portion.

Figure 11:
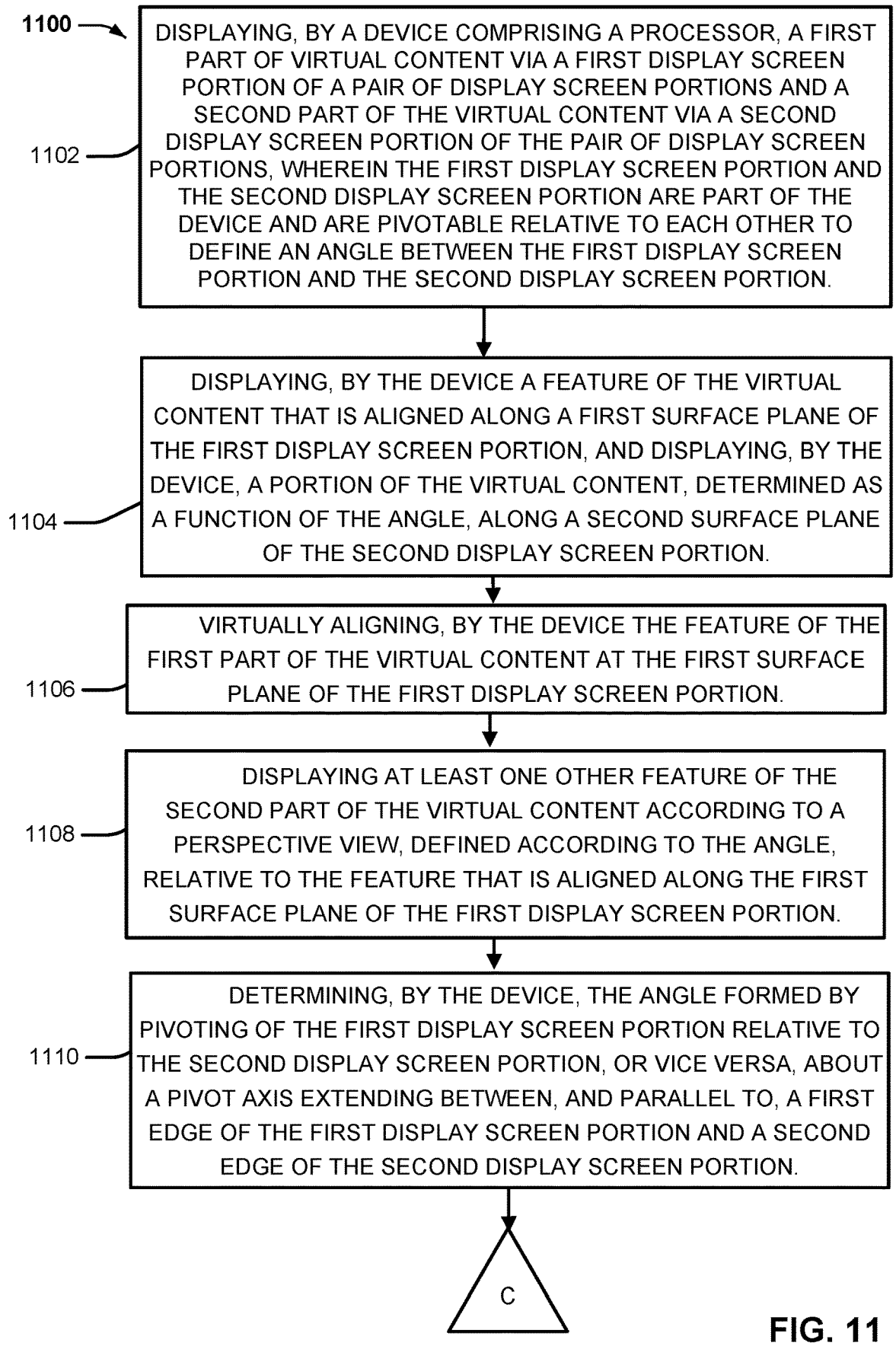
FIG. 11 illustrates still another process flow of a method of use of the modelling output system of FIG. 1A or FIG. 1B, in accordance with one or more embodiments described herein.
Figure 12:
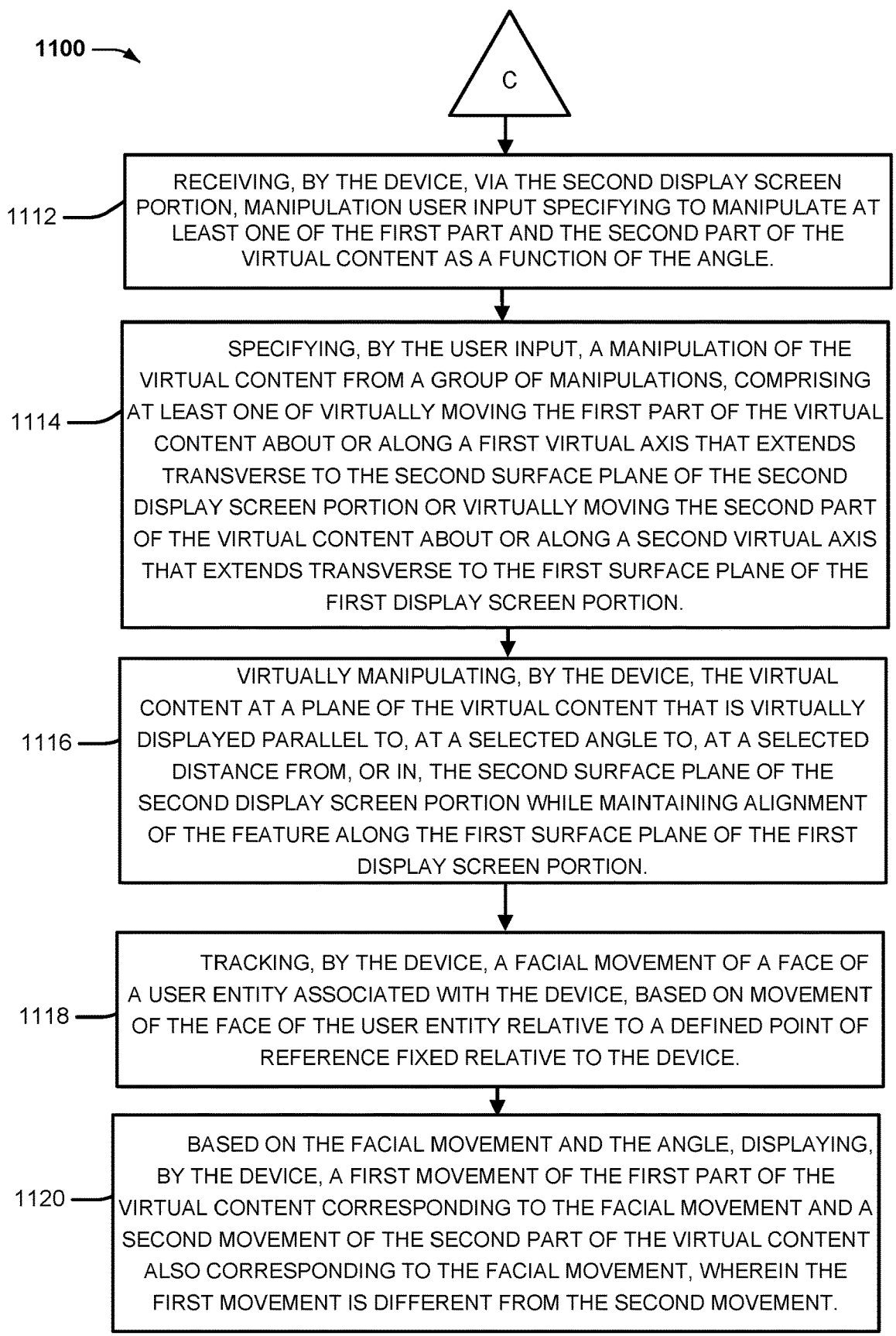
FIG. 12 illustrates a continuation of the process flow of FIG. 11 of a method of use of the modelling output system of FIG. 1A or FIG. 1B, in accordance with one or more embodiments described herein.

Turning now to FIGS. 11 and 12, illustrated is a flow diagram of another example, non-limiting method 1100 that can facilitate a process to display and allow manipulation of a 3D model at a device comprising a pair of display screen portions that together provide a single extended display. Repetitive description of like elements and/or processes employed in respective embodiments is omitted for sake of brevity.

Looking first to operation 1102 at FIG. 11, the non-limiting method 1100 can comprise displaying, by a device comprising a processor (e.g., display component 114 of device 101), a first part of virtual content via a first display screen portion (e.g., first display screen portion 122) of a pair of display screen portions and a second part of the virtual content via a second display screen portion of the pair of display screen portions (e.g., second display screen portion 124).

At operation 1104, the non-limiting method 1100 can comprise displaying, by the device (e.g., display component 114), a feature of the virtual content that is aligned along a first surface plane (e.g., first surface plane 352) of the first display screen portion and displaying, by the device (e.g., display component 114) a portion of the virtual content, determined as a function of the angle, along a second surface plane (e.g., second surface plane 354) of the second display screen portion.

At operation 1106, the non-limiting method 1100 can comprise virtually aligning, by the device (e.g., interface component 116), the feature of the first part of the virtual content at the first surface plane of the first display screen portion.

At operation 1108, the non-limiting method 1100 can comprise displaying, by the device (e.g., display component 114), at least one other feature of the second part of the virtual content according to a perspective view, defined according to the angle, relative to the feature that is aligned along the first surface plane of the first display screen portion.

At operation 1110, the non-limiting method 1100 can comprise determining the angle formed by pivoting of the first display screen portion relative to the second display screen portion, or vice versa, about a pivot axis extending between, and parallel to, a first edge of the first display screen portion and a second edge of the second display screen portion.

At operation 1112, the non-limiting method 1100 can comprise receiving, by the device (e.g., detection component 118) via the second display screen portion, manipulation user input specifying to manipulate at least one of the first part and the second part of the virtual content as a function of the angle.

At operation 1114, the non-limiting method 1100 can comprise specifying, by the user input, a manipulation of the virtual content from a group of manipulations, comprising at least one of virtually moving the first part of the virtual content about or along a first virtual axis that extends transverse to the second surface plane of the second display screen portion or virtually moving the second part of the virtual content about or along a second virtual axis that extends transverse to the first surface plane of the first display screen portion.

At operation 1116, the non-limiting method 1100 can comprise virtually manipulating, by the device (e.g., action component 120), the virtual content at a plane of the virtual content that is virtually displayed parallel to, at a selected angle to, at a selected distance from, or in the second surface plane of the second display screen portion while maintaining alignment of the feature along the first surface plane of the first display screen portion.

At operation 1118, the non-limiting method 1100 can comprise tracking, by the device (e.g., detection component 118), a facial movement of a face of a user entity associated with the device, based on movement of the face of the user entity relative to a defined point of reference fixed relative to the device.

At operation 1120, the non-limiting method 1100 can comprise, based on the facial movement and the angle, displaying, by the device (e.g., display component 114), a first movement of the first part of the virtual content corresponding to the facial movement and a second movement of the second part of the virtual content also corresponding to the facial movement, wherein the first movement is different from the second movement.

SUMMARY

In summary, one or more systems, methods and/or machine-readable mediums are described herein for allowing display and manipulation of surface-based 3D modelling on touchscreens being adjustable relative to one another. A method can comprise displaying, by a mobile device comprising a processor, a first part of virtual content via a first display screen portion of a pair of display screen portions and a second part of the virtual content via a second display screen portion of the pair of display screen portions. The first display screen portion and the second display screen portion are part of the mobile device and are pivotable relative to each other to define an angle between the first display screen portion and the second display screen portion. Displaying the first part of the virtual content comprises displaying a feature of the virtual content that is aligned along a first surface plane of the first display screen portion.

Displaying the second part of the virtual content comprises displaying a portion of the virtual content, determined as a function of the angle, along a second surface plane of the second display screen portion. The method further comprises receiving, via the second display screen portion, manipulation user input specifying to manipulate at least one of the first part and the second part of the virtual content as a function of the angle. The manipulation user input specifies a manipulation of the virtual content from a group of manipulations, comprising at least one of virtually moving the first part of the virtual content about or along a first virtual axis that extends transverse to the second surface plane of the second display screen portion or virtually moving the second part of the virtual content about or along a second virtual axis that extends transverse to the first surface plane of the first display screen portion.

A benefit of the aforementioned system, non-transitory machine-readable medium, and/or computer-implemented method can be low cost (e.g., learning time, effort) and/or low skill barrier for generating 3D models by providing an experience that simulates real-world manipulation due to the surface-based alignment of the virtual 3D model. This low cost and/or low skill can facilitate a low entry barrier for use of the one or more embodiments described herein.

Additionally, another benefit is use of device surface angles, device orientation, and/or user-entity eye orientation as alignment factors for aligning real-world axes of the mobile device with the virtual axes defining the 3D model. In this way, the correspondence between these two sets of axes can be defined based and user-entity preference.

Still another benefit is ability to manipulate the 3D model in three real-world dimensions, each of which can be represented by the adjustable displays (e.g., screens) of the mobile device being used. In this way, the low skill barrier can be facilitated by simulating a real-world object, such as by snapping one or more surfaces of the 3D model being manipulated to a surface of a display of the mobile device, or otherwise aligning the one or more surfaces of the 3D model relative to the surface of the display (e.g., parallel to, contiguous with, non-parallel to, transverse to, at a specified angle to, etc.).

Yet another benefit is the benefit of use of a pair of displays angled relative to one another to facilitate manipulations such as cutting, rotation, extrusion, drilling, etc. of the 3D model, with particular benefit in providing physical support and tactile feedback in the Z-dimension (e.g., a third dimension other than the X-dimension and Y-dimension).

Indeed, a practical application of the systems, computer-implemented methods, and/or computer program products described herein can be a 3D modelling tool facilitating a low barrier of entry by simulating real-world objects using surface-based display and/or manipulation. Overall, such computerized tools can constitute a concrete and tangible technical improvement in the fields of 3D modelling, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to 3D modelling on two or more screens providing a single extended display, as compared to existing systems and/or techniques lacking such approach(es). Systems, computer-implemented methods, and/or computer program products enabling performance of these processes are of great utility in the field of 3D modelling and cannot be equally practicably implemented in a sensible way outside of a computing environment. Indeed, 3D modelling itself is and/or involves a type of a computing environment providing a virtual environment for display and generation of a 3D model.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically generate and provide for manipulation of a 3D model in a virtual environment, which virtual environment itself is generated, as the one or more embodiments described herein can provide this process. And, neither can the human mind nor a human with pen and paper electronically effectively electronically achieve, provide and/or execute such processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

To provide additional summary, a listing of embodiments and features thereof is next provided.

A method, comprising: displaying, by a device comprising a processor, a first part of virtual content via a first display screen portion of a pair of display screen portions and a second part of the virtual content via a second display screen portion of the pair of display screen portions, wherein the first display screen portion and the second display screen portion are part of the device and are adjustable relative to each other to define an angle between the first display screen portion and the second display screen portion, wherein displaying the first part of the virtual content comprises displaying a feature of the virtual content that is aligned along a first surface plane of the first display screen portion, and wherein displaying the second part of the virtual content comprises displaying a portion of the virtual content, determined as a function of the angle, along a second surface plane of the second display screen portion; and receiving, via the second display screen portion, manipulation user input specifying to manipulate at least one of the first part and the second part of the virtual content as a function of the angle, wherein the manipulation user input specifies a manipulation of the virtual content from a group of manipulations, comprising at least one of virtually moving the first part of the virtual content about or along a first virtual axis that extends transverse to the second surface plane of the second display screen portion or virtually moving the second part of the virtual content about or along a second virtual axis that extends transverse to the first surface plane of the first display screen portion.

The method of the preceding paragraph, wherein the second virtual axis is determined to be orthogonal to the first surface plane of the first display screen portion.

The method of any preceding paragraph, wherein the feature is a point, an edge or a plane defining part of a 3-dimensional shape of the virtual content.

The method of any preceding paragraph, wherein the displaying comprises virtually aligning the feature of the first part of the virtual content at the first surface plane of the first display screen portion.

The method of any preceding paragraph, further comprising: determining the angle formed by pivoting of the first display screen portion relative to the second display screen portion, or vice versa, about a pivot axis extending between, and parallel to, a first edge of the first display screen portion and a second edge of the second display screen portion.

The method of any preceding paragraph, wherein the group of manipulations further comprises: virtually manipulating the virtual content at a plane of the virtual content that is virtually displayed parallel to, at a selected angle to, at a selected distance from, or in, the second surface plane of the second display screen portion while maintaining alignment of the feature along the first surface plane of the first display screen portion.

The method of any preceding paragraph, wherein the displaying comprises displaying at least one other feature of the second part of the virtual content according to a perspective view, defined according to the angle, relative to the feature that is aligned along the first surface plane of the first display screen portion.

The method of any preceding paragraph, further comprising: tracking a facial movement of a face of a user entity associated with the device, based on movement of the face of the user entity relative to a defined point of reference fixed relative to the device; and based on the facial movement and the angle, displaying a first movement of the first part of the virtual content corresponding to the facial movement and a second movement of the second part of the virtual content also corresponding to the facial movement, wherein the first movement is different from the second movement.

A system, comprising: a processor; a memory that stores computer executable instructions that are executable, using the processor, to perform operations, comprising: displaying respective portions of virtual content at a first display screen portion of a pair of display screen portions and at a second display screen portion of the pair of display screen portions, wherein the first display screen portion and the second display screen portion are adjustable relative to each other to define an angle; and responsive to manipulation at or along a second surface of the second display screen portion, based on user input corresponding to a user entity associated with a device comprising the first display screen portion and the second display screen portion, and based on a first orientation of a first surface of the first display screen portion that is transverse relative to a second orientation of the second surface of the second display screen portion, virtually manipulating the virtual content along a virtual axis that extends transverse to the first surface, wherein the virtually manipulating is defined as a function of the angle.

The system of the preceding paragraph, wherein direct manipulation of at least one feature of the virtual content, that is viewable via the second surface, is not capable via manipulation at or along the first surface.

The system of any preceding paragraph, wherein the virtually manipulating comprises a virtual manipulation action, comprising extruding, drilling, cutting or tapering, while displaying a result of the virtual manipulating of the virtual content via the second display screen portion.

The system of any preceding paragraph, the operations further comprising: generating tactile feedback when the first surface of the first display screen portion and the second surface of the second display screen portion are aligned at one or more selected angles relative to one another.

The system of any preceding paragraph, wherein the first display screen portion is comprised by a first computing device, and the second display screen portion is comprised by a second computing device, and the operations further comprising: enabling access to the first computing device or the second computing device, and communicatively connecting the first display screen portion and the second display screen portion.

A non-transitory machine-readable medium, comprising executable instructions that, when executed by a processor facilitate performance of operations, comprising: determining an angle between a pair of display screen portions of a device, the pair of display screen portions comprising a first display screen portion and a second display screen portion that are pivotable relative to one another; displaying respective portions of virtual content on the first display screen portion and the second display screen portion based on positioning of respective intersecting surface planes of the first display screen portion and the second display screen portion relative to one another, wherein the displaying comprises representing the virtual content as extending along virtual components of each of virtual X-, Y- and Z-axes that align to physical components of each of physical X-, Y- and Z-axes defined by the respective intersecting first surface plane of the first display screen portion and second surface plane of the second display screen portion depending on the angle between the pair of display screen portions; and in response to manipulation at or along the second surface plane of the second display screen portions, altering the virtual content while maintaining alignment of at least one plane of the virtual content, defined by a pair of the virtual components of the virtual X-, Y- and Z-axes, to the respective surface plane of an alignment screen portion being the first display screen portion or of the second display screen portion.

The non-transitory machine-readable medium of the preceding paragraph, wherein at least one of the virtual components of the virtual X-, Y- or Z-axes is a perspective axis relative to other virtual components of the virtual X-, Y- or Z-axes other than the at least one of the virtual components.

The non-transitory machine-readable medium of any preceding paragraph, wherein the displaying of the virtual content comprises, in response to determining that the angle is greater than or less than 0 degrees, aligning at least one feature of the virtual content along the respective surface plane of the second display screen portion.

The non-transitory machine-readable medium of any preceding paragraph, wherein the displaying of the virtual content comprises aligning at least one feature of the virtual content along the respective surface plane of the second display screen portion, and wherein the operations further comprise receiving user input manipulating the virtual content also at or along the first surface plane of the first display screen portion in conjunction with the manipulation at or along the second surface plane of the second display screen portion.

The non-transitory machine-readable medium of any preceding paragraph, wherein the altering of the virtual content in response to the manipulation at or along the second surface plane of the first display screen portion comprises virtually moving the virtual content about or along a virtual axis that extends orthogonal to the first surface plane of the first display screen portion.

The non-transitory machine-readable medium of any preceding paragraph, wherein the determining of the angle comprises determining the angle as a function of a pivot axis common to first surface plane of the first display screen portion and to the second surface plane of the second display screen portion.

The non-transitory machine-readable medium of any preceding paragraph, wherein the operations further comprise: recognizing touch input, associated with the user entity and received at the first surface plane of the first display screen portion or a second surface plane of the second display screen portion, to manipulate the virtual content, the recognizing comprising recognizing the touch input based on a first tactile-based sensor or a first capacitive-based sensor at the first surface plane of the first display screen portion or a second tactile-based sensor or a second capacitive-based sensor at the second surface plane of the second display screen portion.

Example Operating Environment

Figure 13:
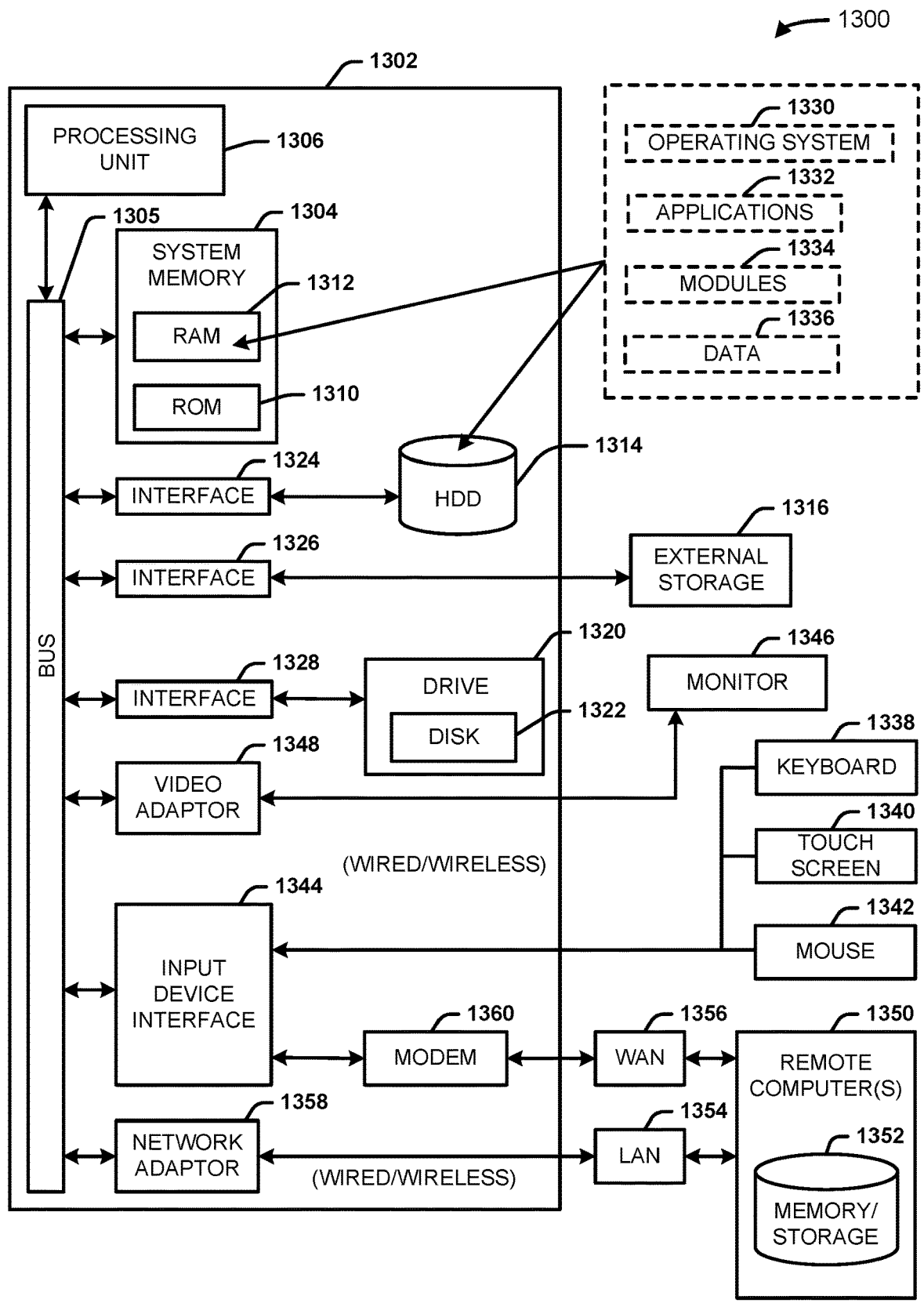
FIG. 13 illustrates a block diagram of an example, non-limiting, operating environment in which one or more embodiments described herein can be operated.

Turning next to FIGS. 13 and 14, a detailed description is provided of additional context for the one or more embodiments described herein at FIGS. 1-12.

FIG. 13 and the following discussion are intended to provide a brief, general description of a suitable operating environment 1300 in which one or more embodiments described herein at FIGS. 1-12 can be implemented. For example, one or more components and/or other aspects of embodiments described herein can be implemented in or be associated with, such as accessible via, the operating environment 1300. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 13, the example operating environment 1300 for implementing one or more embodiments of the aspects described herein can include a computer 1302, the computer 1302 including a processing unit 1306, a system memory 1304 and/or a system bus 1305. One or more aspects of the processing unit 1306 can be applied to processors such as processor 104 of the non-limiting system 100. The processing unit 1306 can be implemented in combination with and/or alternatively to the processor 106.

Memory 1304 can store one or more computer and/or machine readable, writable and/or executable components and/or instructions that, when executed by processing unit 1306 (e.g., a classical processor, and/or like processor), can provide performance of operations defined by the executable component(s) and/or instruction(s). For example, memory 1304 can store computer and/or machine readable, writable, and/or executable components and/or instructions that, when executed by processing unit 1306, can provide execution of the one or more functions described herein relating to the non-limiting system 100, as described herein with or without reference to the one or more figures of the one or more embodiments.

Memory 1304 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 1306 can comprise one or more types of processors and/or electronic circuitry (e.g., a classical processor and/or like processor) that can implement one or more computer and/or machine readable, writable and/or executable components and/or instructions that can be stored at memory 1304. For example, processing unit 1306 can perform one or more operations that can be specified by computer and/or machine readable, writable, and/or executable components and/or instructions including, but not limited to, logic, control, input/output (I/O), arithmetic, and/or the like. In one or more embodiments, processing unit 1306 can be any of one or more commercially available processors. In one or more embodiments, processing unit 1306 can comprise one or more central processing unit, multi-core processor, microprocessor, dual microprocessors, microcontroller, System on a Chip (SOC), array processor, vector processor, and/or another type of processor. The examples of processing unit 1306 can be employed to implement one or more embodiments described herein.

The system bus 1305 can couple system components including, but not limited to, the system memory 1304 to the processing unit 1306. The system bus 1305 can comprise one or more types of bus structure that can further interconnect to a memory bus (with or without a memory controller), a peripheral bus, and/or a local bus using one or more of a variety of commercially available bus architectures. The system memory 1304 can include ROM 1310 and/or RAM 1312. A basic input/output system (BIOS) can be stored in a non-volatile memory such as ROM, erasable programmable read only memory (EPROM) and/or EEPROM, which BIOS contains the basic routines that help to transfer information among elements within the computer 1302, such as during startup. The RAM 1312 can include a high-speed RAM, such as static RAM for caching data.

The computer 1302 can include an internal hard disk drive (HDD) 1314 (e.g., EIDE, SATA), one or more external storage devices 1316 (e.g., a magnetic floppy disk drive (FDD), a memory stick or flash drive reader, a memory card reader and/or the like) and/or a drive 1320, e.g., such as a solid state drive or an optical disk drive, which can read or write from a disk 1322, such as a CD-ROM disc, a DVD, a BD and/or the like. Additionally, and/or alternatively, where a solid state drive is involved, disk 1322 could not be included, unless separate. While the internal HDD 1314 is illustrated as located within the computer 1302, the internal HDD 1314 can also be configured for external use in a suitable chassis (not shown). Additionally, while not shown in operating environment 1300, a solid state drive (SSD) can be used in addition to, or in place of, an HDD 1314. The HDD 1314, external storage device(s) 1316 and drive 1320 can be connected to the system bus 1305 by an HDD interface 1324, an external storage interface 1326 and a drive interface 1328, respectively. The HDD interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1312, including an operating system 1330, one or more applications 1332, other program modules 1334 and/or program data 1336. All or portions of the operating system, applications, modules, and/or data can also be cached in the RAM 1312. The systems and/or methods described herein can be implemented utilizing one or more commercially available operating systems and/or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In a related embodiment, operating system 1330 can comprise one virtual machine (VM) of multiple VMs hosted at computer 1302. Furthermore, operating system 1330 can provide runtime environments, such as the JAVA runtime environment or the .NET framework, for applications 1332. Runtime environments are consistent execution environments that can allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and/or settings for an application.

Further, computer 1302 can be enabled with a security module, such as a trusted processing module (TPM). For instance, with a TPM, boot components hash next in time boot components and wait for a match of results to secured values before loading a next boot component. This process can take place at any layer in the code execution stack of computer 1302, e.g., applied at application execution level and/or at operating system (OS) kernel level, thereby enabling security at any level of code execution.

An entity can enter and/or transmit commands and/or information into the computer 1302 through one or more wired/wireless input devices, e.g., a keyboard 1338, a touch screen 1340 and/or a pointing device, such as a mouse 1342. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint and/or iris scanner, and/or the like. These and other input devices can be connected to the processing unit 1306 through an input device interface 1344 that can be coupled to the system bus 1305, but can be connected by other interfaces, such as a parallel port, an IEEE 1394 serial port, a game port, a USB port, an IR interface, a BLUETOOTH® interface, and/or the like.

A monitor 1346 or other type of display device can be alternatively and/or additionally connected to the system bus 1305 via an interface, such as a video adapter 1348. In addition to the monitor 1346, a computer typically includes other peripheral output devices (not shown), such as speakers, printers, and/or the like.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device and/or other common network node, and typically includes many or all of the elements described relative to the computer 1302, although, for purposes of brevity, only a memory/storage device 1352 is illustrated. Additionally, and/or alternatively, the computer 1302 can be coupled (e.g., communicatively, electrically, operatively, optically and/or the like) to one or more external systems, sources, and/or devices (e.g., computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver, a decoder, and/or the like), software (e.g., a set of threads, a set of processes, software in execution and/or the like) and/or a combination of hardware and/or software that provides communicating information among one or more embodiments described herein and external systems, sources, and/or devices (e.g., computing devices, communication devices and/or the like).

The logical connections depicted include wired/wireless connectivity to a local area network (LAN) 1354 and/or larger networks, e.g., a wide area network (WAN) 1356. LAN and WAN networking environments can be commonplace in offices and companies and can provide enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can provide wired and/or wireless communication to the LAN 1354, which can also include a wireless access point (AP) disposed thereon for communicating with the adapter 1358 in a wireless mode.

When used in a WAN networking environment, the computer 1302 can include a modem 1360 and/or can be connected to a communications server on the WAN 1356 via other means for establishing communications over the WAN 1356, such as by way of the Internet. The modem 1360, which can be internal and/or external and a wired and/or wireless device, can be connected to the system bus 1305 via the input device interface 1344. In a networked environment, program modules depicted relative to the computer 1302 or portions thereof can be stored in the remote memory/storage device 1352. The network connections shown are merely exemplary and one or more other means of establishing a communications link among the computers can be used.

When used in either a LAN or WAN networking environment, the computer 1302 can access cloud storage systems or other network-based storage systems in addition to, and/or in place of, external storage devices 1316 as described above, such as but not limited to, a network virtual machine providing one or more aspects of storage and/or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, such as with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1002 described below with reference to illustration 1000 of FIG. 10. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting system 100, and/or the example operating environment 1300 of FIG. 13, can be associated with and/or be included in cloud-based and/or partially-cloud-based system.

Referring now to details of one or more elements illustrated at FIG. 14, the illustrative cloud computing environment 1402 is depicted. Cloud computing environment 1402 can comprise one or more cloud computing nodes, virtual machines, and/or the like with which local computing devices used by cloud clients 1404, such as for example via one or more devices 1406, systems 1408, virtual machines 1410, networks 1412, and/or applications 1414.

The one or more cloud computing nodes, virtual machines and/or the like can be grouped physically or virtually, in one or more networks, such as local, distributed, private, public clouds, and/or a combination thereof. The cloud computing environment 1402 can provide infrastructure, platforms, virtual machines, and/or software for which a client 1404 does not maintain all or at least a portion of resources on a local device, such as a computing device. The various elements 1406 to 1412 are not intended to be limiting and are but some of various examples of computerized elements that can communicate with one another and/or with the one or more cloud computing nodes via the cloud computing environment 1402, such as over any suitable network connection and/or type.

CONCLUSION

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or beneficial over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:
1. A method, comprising:
  displaying, by a device comprising a processor, a first part of virtual content via a first display screen portion of a pair of display screen portions and a second part of the virtual content via a second display screen portion of the pair of display screen portions,
  wherein the first display screen portion and the second display screen portion are part of the device and are adjustable relative to each other to define an angle between the first display screen portion and the second display screen portion,
  wherein displaying the first part of the virtual content comprises displaying a feature of the virtual content that is aligned along a first surface plane of the first display screen portion,
  wherein displaying the second part of the virtual content comprises displaying a portion of the virtual content, determined as a function of the angle, along a second surface plane of the second display screen portion, and wherein the displaying of the first part and the second part comprises representing the virtual content as extending along virtual components of each of virtual X-, Y- and Z-axes that align to physical components of each of physical X-, Y- and Z-axes defined by the respective first surface plane of the first display screen portion and the second surface plane of the second display screen portion;

determining values of the virtual components of each of the virtual X-, Y- and Z-axes as the function of the angle;

receiving, via the second display screen portion, manipulation user input specifying to manipulate at least one of the first part or the second part of the virtual content as a function of the angle, wherein the manipulation user input specifies a manipulation of the virtual content from a group of manipulations, comprising at least one of virtually moving the first part of the virtual content about or along a first virtual axis that extends transverse to the second surface plane of the second display screen portion or virtually moving the second part of the virtual content about or along a second virtual axis that extends transverse to the first surface plane of the first display screen portion; and in response to receiving the manipulation user input, altering the virtual content while maintaining alignment of at least one plane of the virtual content to a respective surface plane of an alignment screen portion, wherein the respective surface plane of the alignment screen portion is comprised by the first surface plane of the first display screen portion or by the second surface plane of the second display screen portion, and wherein the at least one plane of the virtual content is defined by a pair of the virtual components of the virtual X-, Y- and Z-axes.

2. The method of claim 1, wherein the second virtual axis is determined to be orthogonal to the first surface plane of the first display screen portion.

3. The method of claim 1, wherein the feature is a point, an edge or a plane defining part of a 3-dimensional shape of the virtual content.

4. The method of claim 1, wherein the displaying comprises virtually aligning the feature of the first part of the virtual content at the first surface plane of the first display screen portion.

5. The method of claim 1, further comprising:
determining the angle formed by pivoting of the first display screen portion relative to the second display screen portion, or vice versa, about a pivot axis extending between, and parallel to, a first edge of the first display screen portion and a second edge of the second display screen portion.

6. The method of claim 1, wherein the group of manipulations further comprises:
virtually manipulating the virtual content at the at least one plane or at another plane of the virtual content that is virtually displayed parallel to, at a selected angle to, at a selected distance from, or in, the second surface plane of the second display screen portion while maintaining alignment of the feature along the first surface plane of the first display screen portion.

7. The method of claim 1, wherein the displaying comprises displaying at least one other feature of the second part of the virtual content according to a perspective view, defined according to the angle, relative to the feature that is aligned along the first surface plane of the first display screen portion.

8. The method of claim 1, further comprising:
tracking a facial movement of a face of a user entity associated with the device, based on movement of the face of the user entity relative to a defined point of reference fixed relative to the device; and based on the facial movement and the angle, displaying a first movement of the first part of the virtual content corresponding to the facial movement and a second movement of the second part of the virtual content also corresponding to the facial movement, wherein the first movement is different from the second movement.

9. A system, comprising:
a processor;
a memory that stores computer executable instructions that are executable, using the processor, to perform operations, comprising:
displaying respective portions of virtual content at a first display screen portion of a pair of display screen portions and at a second display screen portion of the pair of display screen portions, wherein the first display screen portion and the second display screen portion are adjustable relative to each other to define an angle;

wherein the displaying the respective portions of the virtual content comprises representing the respective portions of the virtual content as extending along virtual components of each of virtual X-, Y- and Z-axes, and wherein the virtual components of each of the virtual X-, Y- and Z-axes align to physical components of each of physical X-, Y- and Z-axes that are defined by a respective first surface plane of the first display screen portion and by a respective second surface plane of the second display screen portion;

determining values of the virtual components of each of the virtual X-, Y- and Z-axes are determined as a function of the angle; and responsive to manipulation at or along a second surface of the second display screen portion, based on user input corresponding to a user entity associated with a device comprising the first display screen portion and the second display screen portion, and based on a first orientation of a first surface of the first display screen portion that is transverse relative to a second orientation of the second surface of the second display screen portion, virtually manipulating the virtual content along a virtual axis that extends transverse to the first surface, wherein the virtually manipulating is defined as the function of the angle, wherein the virtually manipulating comprises maintaining alignment of at least one plane of the virtual content, defined by a pair of the virtual components of the virtual X-, Y- and Z-axes, to the respective surface plane of an alignment screen portion, and wherein the respective surface plane of the alignment screen portion is comprised by the first surface plane of the first display screen portion or by the second surface plane of the second display screen portion.

10. The system of claim 9, wherein direct manipulation of at least one feature of the virtual content, that is viewable via the second surface, is not capable via manipulation at or along the first surface.

11. The system of claim 9, wherein the virtually manipulating comprises a virtual manipulation action, comprising extruding, drilling, cutting or tapering, while displaying a result of the virtual manipulating of the virtual content via the second display screen portion.

12. The system of claim 9, the operations further comprising:
generating tactile feedback when the first surface of the first display screen portion and the second surface of the second display screen portion are aligned at one or more selected angles relative to one another.

13. The system of claim 9,
wherein the first display screen portion is comprised by a first computing device, and the second display screen portion is comprised by a second computing device, and
the operations further comprising:
enabling access to the first computing device or the second computing device, and
communicatively connecting the first display screen portion and the second display screen portion.

14. A non-transitory machine-readable medium, comprising executable instructions that, when executed by a processor facilitate performance of operations, comprising:
determining an angle between a pair of display screen portions of a device, the pair of display screen portions comprising a first display screen portion and a second display screen portion that are pivotable relative to one another;
displaying respective portions of virtual content on the first display screen portion and the second display screen portion based on positioning of respective intersecting surface planes of the first display screen portion and the second display screen portion relative to one another,
wherein the displaying comprises representing the virtual content as extending along virtual components of each of virtual X-, Y- and Z-axes that align to physical components of each of physical X-, Y- and Z-axes defined by the respective intersecting first surface plane of the first display screen portion and second surface plane of the second display screen portion depending on the angle between the pair of display screen portions; and
in response to manipulation at or along the second surface plane of the second display screen portions, altering the virtual content while maintaining alignment of at least one plane of the virtual content, defined by a pair of the virtual components of the virtual X-, Y- and Z-axes, to the respective surface plane of an alignment screen portion,
wherein the respective plane of the alignment screen portion is comprised by the first surface plane of the first display screen portion or by the second surface plane of the second display screen portion.

15. The non-transitory machine-readable medium of claim 14, wherein at least one of the virtual components of the virtual X-, Y- or Z-axes is a perspective axis relative to other virtual components of the virtual X-, Y- or Z-axes other than the at least one of the virtual components.

16. The non-transitory machine-readable medium of claim 14, wherein the displaying of the virtual content comprises, in response to determining that the angle is greater than or less than 0 degrees, aligning at least one feature of the virtual content along the respective surface plane of the second display screen portion.

17. The non-transitory machine-readable medium of claim 14, wherein the displaying of the virtual content comprises aligning at least one feature of the virtual content along the respective surface plane of the second display screen portion, and wherein the operations further comprise receiving user input manipulating the virtual content also at or along the first surface plane of the first display screen portion in conjunction with the manipulation at or along the second surface plane of the second display screen portion.

18. The non-transitory machine-readable medium of claim 14, wherein the altering of the virtual content in response to the manipulation at or along the second surface plane of the first display screen portion comprises virtually moving the virtual content about or along a virtual axis that extends orthogonal to the first surface plane of the first display screen portion.

19. The non-transitory machine-readable medium of claim 14, wherein the determining of the angle comprises determining the angle as a function of a pivot axis common to first surface plane of the first display screen portion and to the second surface plane of the second display screen portion.

20. The non-transitory machine-readable medium of claim 14, wherein the operations further comprise:
recognizing touch input, associated with the user entity and received at the first surface plane of the first display screen portion or a second surface plane of the second display portion, to manipulate the virtual content, the recognizing comprising recognizing the touch input based on a first tactile-based sensor or a first capacitive-based sensor at the first surface plane of the first display screen portion or a second tactile-based sensor or a second capacitive-based sensor at the second surface plane of the second display portion.

* * * * *